(12) United States Patent
Miyabe

(10) Patent No.: US 10,237,170 B2
(45) Date of Patent: Mar. 19, 2019

(54) FLOW SWITCH, CONTROLLER AND RELAY APPARATUS

(71) Applicant: FUJITSU LIMITED, Kawasaki-shi, Kanagawa (JP)

(72) Inventor: Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 15/205,398

(22) Filed: Jul. 8, 2016

(65) Prior Publication Data

US 2017/0063675 A1 Mar. 2, 2017

(30) Foreign Application Priority Data

Aug. 25, 2015 (JP) ................................ 2015-166021

(51) Int. Cl.
| | |
|---|---|
| *H04L 12/721* | (2013.01) |
| *H04L 12/851* | (2013.01) |
| *H04L 29/06* | (2006.01) |
| *H04L 29/08* | (2006.01) |
| *H04L 12/717* | (2013.01) |
| *H04L 12/931* | (2013.01) |
| *H04L 12/939* | (2013.01) |
| *H04L 12/947* | (2013.01) |

(52) U.S. Cl.
CPC .............. *H04L 45/38* (2013.01); *H04L 45/42* (2013.01); *H04L 47/2483* (2013.01); *H04L 49/00* (2013.01); *H04L 49/25* (2013.01); *H04L 49/50* (2013.01); *H04L 49/55* (2013.01); *H04L 67/28* (2013.01); *H04L 69/08* (2013.01); *H04L 69/18* (2013.01); *H04L 69/324* (2013.01); *Y02D 30/30* (2018.01)

(58) Field of Classification Search
None
See application file for complete search history.

(56) References Cited

U.S. PATENT DOCUMENTS

2010/0067529 A1    3/2010  Chen et al.
2011/0317701 A1*  12/2011  Yamato .................. H04L 45/04
                                              370/392
(Continued)

FOREIGN PATENT DOCUMENTS

| | | |
|---|---|---|
| CN | 104205055 | 12/2014 |
| JP | 2011-82834 | 4/2011 |

(Continued)

OTHER PUBLICATIONS

ONF, "OpenFlow Switch Specification", Version 1.5.1 (Protocol version 0x06), Mar. 26, 2015, ONF TS-025, pp. 1-283, The Open Networking Foundation, XP055317414. (Cited in EESR).

(Continued)

*Primary Examiner* — Saba Tsegaye
(74) *Attorney, Agent, or Firm* — Fujitsu Patent Center

(57) ABSTRACT

A flow switch stores a plurality of pairs of a protocol message for a communication protocol used in a data plane communication and an identifier of the protocol message. The flow switch applies any one of the stored protocol messages to the data plane communication, and applies an identifier corresponding to a protocol message of a flow control target in the data plane to a control plane communication for a controller.

5 Claims, 25 Drawing Sheets

(56) References Cited

U.S. PATENT DOCUMENTS

| | | | |
|---|---|---|---|
| 2012/0044935 A1* | 2/2012 | Hama | H04L 12/4625 370/389 |
| 2012/0257529 A1 | 10/2012 | Ehara et al. | |
| 2013/0003745 A1* | 1/2013 | Nishimura | H04L 12/4641 370/400 |
| 2013/0064243 A1* | 3/2013 | Akiyoshi | H04L 45/38 370/389 |
| 2013/0266018 A1 | 10/2013 | Ashida et al. | |
| 2014/0016647 A1* | 1/2014 | Yoshida | H04L 12/4666 370/395.53 |
| 2015/0215203 A1 | 7/2015 | Nakano et al. | |

FOREIGN PATENT DOCUMENTS

| | | |
|---|---|---|
| JP | 2014-27443 | 2/2014 |
| JP | 2014-502811 | 2/2014 |
| WO | 2012/090354 A1 | 7/2012 |
| WO | 2013144747 A1 | 10/2013 |

OTHER PUBLICATIONS

EESR—The Extended European Search Report dated Jan. 11, 2017 for corresponding European Patent Application No. 16178992.0.
IEEE 802.1 AB, IEEE Standard for Local and metropolitan area networks. "Station and Media Access Control Connectivity Discovery", IEEE Computer Society, May 6, 2005 (172 pages).
CNOA—Office Action of Chinese Patent Application No. 201610608327.6 dated Jan. 4, 2019 with relevant English ranslation of the Office Action.

* cited by examiner

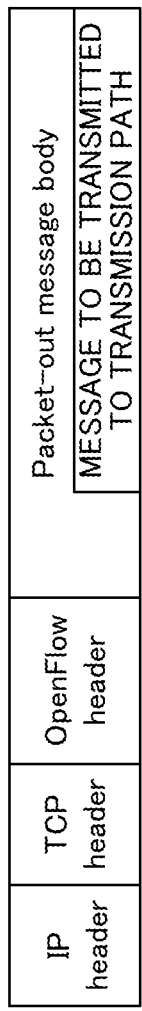
FIG. 3A  PACKET-OUT
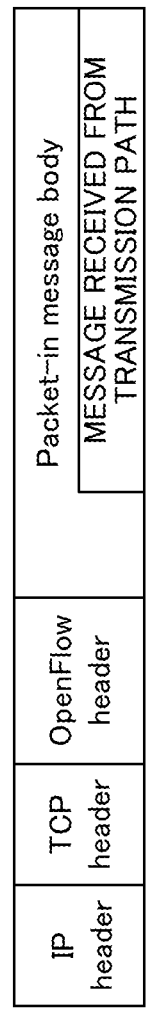
FIG. 3B  PACKET-IN

FIG. 7

REGISTRATION REQUEST MESSAGE (OR DELETION REQUEST MESSAGE)

| IP header | TCP header | OpenFlow header | REGISTRATION (OR DELETION) REQUEST message body |
|---|---|---|---|
| | | | IDENTIFIER / LLDP PACKET IMAGE |

FIG. 9

SEND-OUT REQUEST MESSAGE

| IP header | TCP header | OpenFlow header | SEND-OUT REQUEST message body |
| --- | --- | --- | --- |
| | | | IDENTIFIER / port |

FIG. 12

REGISTRATION REQUEST MESSAGE

| IP header | TCP header | OpenFlow header | REGISTRATION REQUEST message body |
|---|---|---|---|
| | | | IDENTIFIER | LLDP PACKET IMAGE |

FIG. 14

RECEPTION NOTIFICATION MESSAGE

| IP header | TCP header | OpenFlow header | RECEPTION NOTIFICATION message body | |
|---|---|---|---|---|
| | | | IDENTIFIER | port |

FLOW SWITCH, CONTROLLER AND RELAY APPARATUS

CROSS-REFERENCE TO RELATED APPLICATION

This application is based upon and claims the benefit of priority of the prior Japanese Patent application No. 2015-166021, filed on Aug. 25, 2015, the entire contents of which are incorporated herein by reference.

FIELD

The embodiments discussed herein are related to a flow switch, a controller, and a relay apparatus.

BACKGROUND

In recent years, since a virtualization of computing resources is developed and virtual computers can be deployed in a network on-demand, an SDN (Software Defined Networking) has attracted attention.

The SDN is a technology available to set or change a network on demand with software. Thus, applying the SDN to a network in which plural flow switches are managed and controlled by a single controller has been studied.

An open flow (OF) protocol is one of promising candidates of a communication protocol available to implement the SDN in such a network. The controller is possible to manage and control each flow switch by communicating with each flow switch using the OF protocol.

A controller that supports the OF protocol may be referred to as an OF controller (OFC) and a flow switch that supports the OF protocol may be referred to as an OF switch (or OpenFlow SW).

LIST OF RELATED ART DOCUMENTS

Patent Document 1: JP 2014-502811 T
Patent Document 2: JP 2011-82834 A
Patent Document 3: JP 2014-27443 A
Non-Patent Document 1: IEEE 802.1 AB However, as traffic in a control plane related to management or control between the controller and each flow switch is increased, a congestion may be occurred in the control plane.

SUMMARY

In one aspect, a flow switch may include a storage unit and a communication processor. The storage unit may store a plurality of pairs of a protocol message for a communication protocol used in a data plane communication and an identifier of the protocol message. The communication processor may apply a protocol message selected from the storage unit to the data plane communication, and apply an identifier selected from the storage unit to a control plane communication for a controller. The selected identifier corresponds to a protocol message of a control target of the flow. The controller may control any one of flows of the protocol messages in the data plane communication.

In another aspect, a controller may include a storage unit and a communication processor. The storage unit may store a plurality of pairs of a protocol message for a communication protocol used in a data plane communication between a plurality of flow switches and an identifier of the protocol message. The communication processor may apply an identifier selected from the storage unit to a control plane communication for controlling any one of flows of the protocol messages in the data plane communication. The selected identifier corresponds to a protocol message of a control target of the flow.

In still another aspect, a relay apparatus may relay a control plane communication between a controller and a plurality of flow switches. The relay apparatus may include a storage unit and a communication processor. The storage unit may store a plurality of pairs of a protocol message for a communication protocol used in a data plane communication between the flow switches and an identifier of the protocol message. The communication processor may apply an identifier selected from the storage unit to a control plane communication for the controller. The controller may be configured to control any one of flows of the protocol messages in the data plane communication. The selected identifier corresponds to a protocol message of a control target of the flow. The communication processor may apply a protocol message to the control plane communication for any one of the flow switches. The protocol message applied to the control plane communication corresponds to an identifier selected from the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is a diagram illustrating a format example of the packet-out message;

FIG. 3B is a diagram illustrating a format example of the packet-in message;

FIG. 7 is a diagram illustrating a format example of a registration (or deletion) request message used in the first embodiment;

FIG. 9 is a diagram illustrating a format example of a send-out request message used in the first embodiment;

FIG. 12 is a diagram illustrating a format example of a registration request message (or a deletion request message) used in the first embodiment;

FIG. 14 is a diagram illustrating a format example of a reception notification message used in the first embodiment;

DESCRIPTION OF EMBODIMENTS

Figure 1:
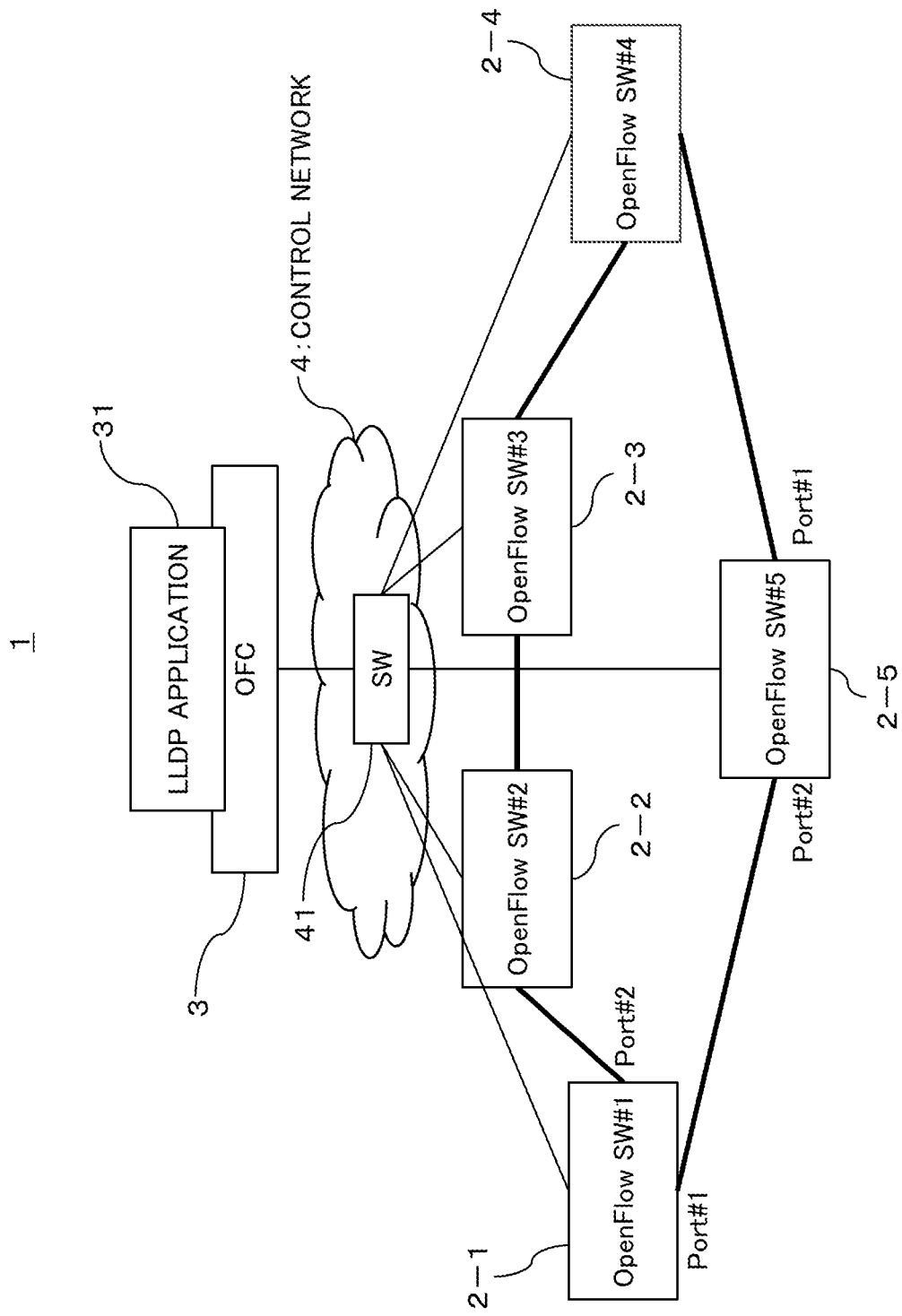
FIG. 1 is a block diagram illustrating a configuration example of a communication system according to a first embodiment.

Hereinafter, the embodiments will be described with reference to the drawings. However, the embodiments described below are only illustrative and do not intend to exclude application of various modifications and technologies that are not explicitly described below. Further, various exemplary aspects described below may be optionally combined and carried out. In addition, components assigned the same reference numeral in the drawings used for the following embodiment will represent identical or same components unless otherwise specified.

(First Embodiment)

FIG. 1 is a block diagram illustrating a configuration example of a communication system according to a first embodiment. As illustrated in FIG. 1, a communication system 1 may include a plurality of switches 2-1 to 2-N (#1 to #N) and a controller 3. "N" is an integer equal to 2 or greater and N=5 in the example of FIG. 1. When there is no need to distinguish the switches 2-1 to 2-N (#1 to #N) from each other, they may be expressed as the switch(es) 2-$i$ (#$i$) ($i$=one of 1 to N) or the switch(es) 2.

Each of the switches 2 is an example of a communication apparatus or a communication device and may be an OpenFlow SW which supports the open flow (OF) protocol. As described above, the OF protocol is one promising candidate of a communication protocol available to implement the SDN.

The controller 3 may be communicably connected with each of the switches 2 via a control network 4. The operation of each of the switches 2 can be managed and controlled centerizedly by communication via the control network 4.

Communication related to management or control of each of the switches 2 via the control network 4 may be referred to as "control communication" or "control plane communication" for the purpose of descriptions. The "control plane communication" may be abbreviated as "CP communication". A signal and a message used for the "CP communication" may be referred to as a "control signal" and a "control message", respectively. The OF protocol is applicable to the "CP communication".

The controller 3 available to perform the CP communication using the OF protocol may be referred to as an "open flow controller (OFC) 3". The control network 4 may include a switch 41 that is available to switch the connection of control communication between the OFC 3 and the OpenFlow SW 2. The communication system 1 provide with the OFC 3 and the OpenFlow SW 2 may be referred to as an "OF network 1".

In the OF network 1, the OFC 3 and an application 31 which runs in the OFC 3 may be considered as constituting a control plane (CP). Meanwhile, each of the OpenFlow SW 2 may be considered as constituting a data plane (DP). In other words, it is possible to separate the CP and the DP by applying the OF protocol to the CP communication between the OpenFlow SW 2 and the OFC 3.

An example of the application 31 which runs in the OFC 3 may be an application that supports an LLDP (Link Layer Discovery Protocol). Thus, the application 31 may be referred to as an "LLDP application 31".

In the OF protocol, a "packet-in message" and a "packet-out message" are defined. These messages enable to provide an apparatus corresponding to any one of various protocols on demand in a DP transmission path. Each of the messages is an example of a "control message".

The "packet-in message" may be used to notify the OFC 3 of data (for example, packets) of various protocols received from the DP transmission path. Meanwhile, the "packet-out message" may be used to instruct packet transmission (or send-out) of various communication protocols to the DP transmission path by the OFC 3.

Figure 2:
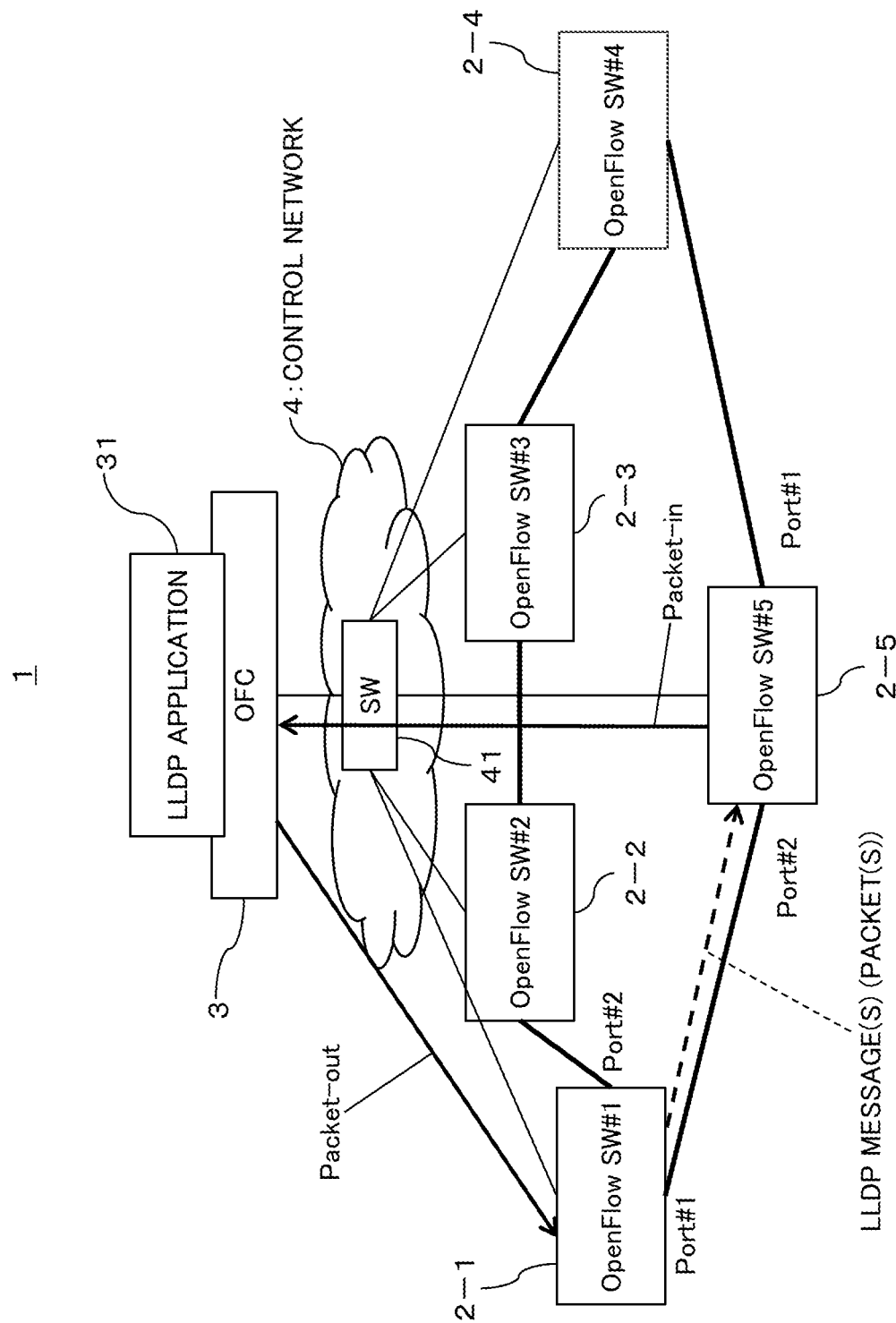
FIG. 2 is a diagram schematically illustrating an example in which messages of a communication protocol are exchanged on data plane (DP) transmission paths in the communication system in FIG. 1 using a packet-in message and a packet-out message.

FIG. 2 schematically illustrates an example in which an LLDP message (may be referred to as an "LLDP packet") is exchanged on the DP transmission path using the packet-in message and the packet-out message. The "packet-in message" and the "packet-out message" may be abbreviated as a "packet-in" and a "packet-out", respectively.

In FIG. 2, the LLDP application 31 instructs the OFC 3 to allow the OFC 3 to receive (or accept) an LLDP packet received from the DP transmission path.

According to the instruction, the OFC 3 may set a flow entry, for each of the OpenFlow SW 2, indicating that when a message (an LLDP packet) with an LLDP header is received from a DP transmission path, the packet is to be transmitted to the OFC 3.

Next, the LLDP application 31 instructs the OFC 3 to generate an LLDP packet to be sent out from, for example, the port#1 of the OpenFlow SW#1 and to cause the port#1 of the OpenFlow SW#1 to send out the LLDP packet.

According to the instruction, the OFC 3 sends the packet-out to the OpenFlow SW#1. A format example of the packet-out is illustrated in FIG. 3A. The packet-out may include an LLDP packet generated by the LLDP application 31 and information (may be referred to as "transmission port information") indicative of an instruction to send out the LLDP packet from the port#1.

When the OpenFlow SW#1 receives the packet-out from the OFC 3, the OpenFlow SW#1 sends out the LLDP packet from the instructed port#1.

As illustrated in FIG. 2, in a case where the port#1 of the OpenFlow SW#1 is connected to the port#2 of the OpenFlow SW#5, the LLDP packet sent out from the port#1 of the OpenFlow SW#1 is received at the port#2 of the OpenFlow SW#5.

As described above, a flow entry indicating that a received LLDP packet is to be transmitted to the OFC 3 has been set in the OpenFlow SW#5, and thus, the OpenFlow SW#5 transmits the received LLDP packet to the OFC 3 using a packet-in.

A format example of the packet-in is illustrated in FIG. 3B. The packet-in may include an LLDP packet received from a DP transmission path and information (may be referred to as "reception port information") indicative of the port (#2) that has received the LLDP packet.

When the OFC 3 receives the packet-in, the OFC 3 delivers an LLDP packet included in the received packet-in and the reception port information to the LLDP application 31.

According to the procedure as described above, the OpenFlow SW 2 and the OFC 3 are available to provide a link discovery function with the LLDP for the DP transmission path.

By changing the application 31 of the OFC 3 to an application of another communication protocol different from the LLDP, it is possible to provide a function corresponding to the different communication protocol for the DP transmission path between the OpenFlow SW 2 using a mechanism similar to the above.

Further, by preparing applications 31 corresponding to various communication protocols for the OFC 3 and changing the application 31 in response to a request, it is possible to provide the requested function corresponding to a communication protocol for the DP transmission path on demand.

In order to ensure an interoperability, it is preferable to use messages (may also referred to as "protocol messages") compliant with a specification of standard communication protocol for a transmission and a reception on a CP transmission path between the OpenFlow SW 2 and the OFC 3. Thus, as illustrated in FIGS. 3A and 3B, messages of the OF protocol may be encapsulated with a TCP (Transmission Control Protocol) header and an IP (Internet Protocol) header, for example.

Figure 4:
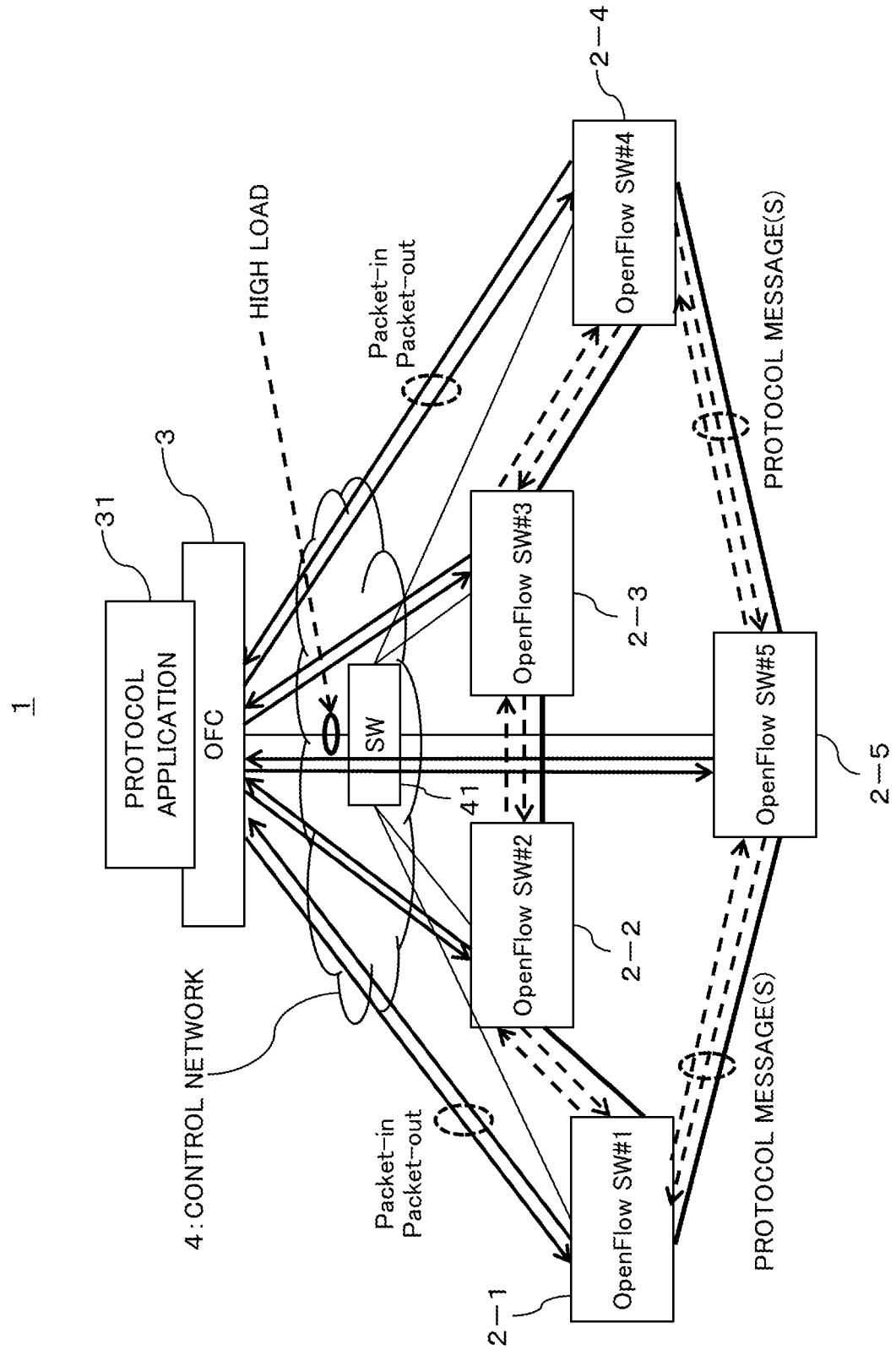
FIG. 4 is a diagram schematically illustrating an example of a load-up in a control network in the communication system illustrated in FIGS. 1 and 2.

By the way, as illustrated in FIG. 4, in a case where the application 31 of the OFC 3 transmits and receives a large number of protocol messages on the DP transmission path, or in a case where the number of the OpenFlow SWs 2 to be controlled by the single OFC 3 is large, the control network 4 may be congested.

In recent years, applying the SDN to not only a data center but also to a public network has been discussed. However, in the public network, bands available for the control network 4 are commonly limited. Therefore, it is considered that a congestion in the control network 4 may be occurred frequently. Further, since the number of control target devices to be controlled in the public network is commonly large, it is expected to increase cases where a large number of the OpenFlow SW 2 are controlled by the single OFC3.

Thus, when a message (or packet) is simply transmitted on the DP transmission path using the packet-out and packet-in of the OF protocol, a congestion occurs easily in the control network 4.

Therefore, a technology available to avoid or suppress a congestion in the control network 4 used by the OFC3 to control the OpenFlow SWs 2 will be described below.

In some communication protocols, messages with the same content may periodically be transmitted in a normal state. Accordingly, it is possible to check or confirm a connectivity (or reachability) of a transmission path between communication apparatuses. Further, the communication apparatuses are possible to check or confirm no status change in the corresponding apparatus for each other.

In the standard OF protocol, as illustrated in FIG. 3A, the packet-out includes the whole message to be sent out to the DP transmission path. Even when the packet-out includes a message of the same content as that of a message received in past, the OFC 3 needs to transmit the packet-out to the OpenFlow SW 2 for each time to send out the message to the DP transmission path.

As illustrated in FIG. 3B, the packet-in includes the whole message received by the OpenFlow SW 2 from the DP transmission path. Even when messages have the same content, the OpenFlow SW 2 transmits the whole received message by including the message in the packet-in to the OFC 3 for each time of a reception of the message.

Therefore, by suppressing such duplicate transmission and reception of messages having the same content between the OFC 3 and the OpenFlow SW 2 in the normal state, it is possible to reduce the load of the control network 4 and to avoid or suppress an occurrence of congestion in the control network 4.

For example, the OpenFlow SW 2 may be provided with a database (DB) of identifiers corresponding to content of messages. When messages of the same content are repeatedly transmitted from the application 31 of the OFC 3, the OFC 3 adds (or registers) to the DB of the OpenFlow SW 2 the identifier corresponding to the content of messages to be sent out to the DP transmission path between the OpenFlow SW 2.

Then, the OFC 3 may instruct to send out a message to the DP transmission path by transmitting, instead of the message itself to be sent out to the DP transmission path, a control message comparable to the packet-out including the identifier corresponding to the content of the message to the OpenFlow SW 2.

Further, when repeated reception of messages of the same content by the application 31 is expected, the OFC 3 adds (or registers) to the database of the OpenFlow SW 2 the identifier corresponding to the content of messages expected to be received repeatedly.

When the OpenFlow SW 2 receives a message registered in the DB is received from the DP transmission path, the OpenFlow SW 2 transmits to the OFC 3 a control message comparable to the packet-in which includes the identifier corresponding to the content of the message.

As describe above, by including the corresponding identifier alternative to the whole message in a control message in the CP communication between the OpenFlow SW and the OFC 3, it is possible to reduce the size (in other words, the capacity) of messages flowing in the control network 4. Therefore, it is possible to reduce the load of the control network 4.

The "control message" including the identifier that corresponds to message content flowing through the DP transmission path may be considered as a "extended message" extended from a standard control message used in the OF protocol.

For example, a packet-out including the identifier alternative to the message content may be referred to as an "extended packet-out". Similarly, a packet-in including the identifier alternative to the message content may be referred to as an "extended packet-in".

(Operation Example)

Hereinafter, an operation example of the communication system 1 will be described with reference to FIGS. 5 to 14.

Figure 5:
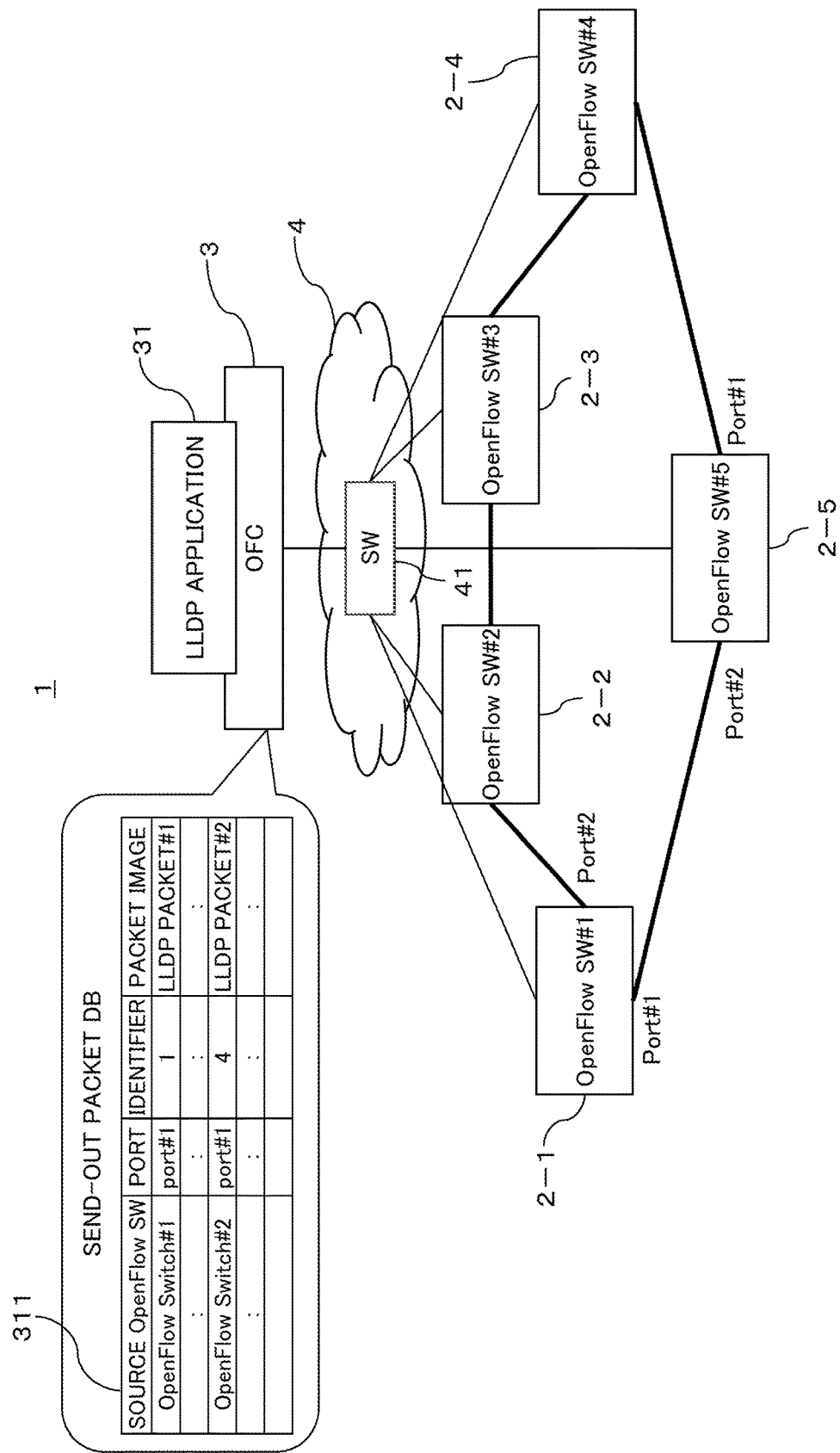
FIGS. 5 and 6 are diagrams illustrating an operation example of the communication system according to the first embodiment.

The communication system 1 illustrated in FIG. 5 may have the same configuration as the configuration illustrated in FIG. 1. In FIG. 5, it is assumed that the LLDP application 31 available to provide the function of LLDP on the DP transmission path runs in the OFC 3. It is also assumed that the OFC 3 (for example, the LLDP application 31) does not recognize a connection configuration (may also be referred to as a "topology") between the OpenFlow SWs 2 in the initial state.

The LLDP application 31 sets a flow entry to all of the OpenFlow SWs 2 to be controlled by the OFC 3, which indicates that a packet in which "88-CC" indicative of the LLDP as an Ethernet type value is set is to be transmitted to the OFC 3. The "Ethernet" is a registered trademark.

Next, the LLDP application 31 generates an LLDP packet as an example of a protocol message to be sent out from each port of the OpenFlow SWs 2. As illustrated on the upper left of FIG. 5, the LLDP application 31 may generate a database (DB) 311 in which information on a source OpenFlow SW 2, information on a source port, and an identifier are registered for each content (may also be referred to as "image") of the generated LLDP packet. The DB 311 may be referred to as a "send-out packet DB 311".

The send-out packet DB 311 may store a plurality of pairs of a message used for DP communication between a plurality of the OpenFlow SW 2 and the identifier of the corresponding message.

Figure 6:
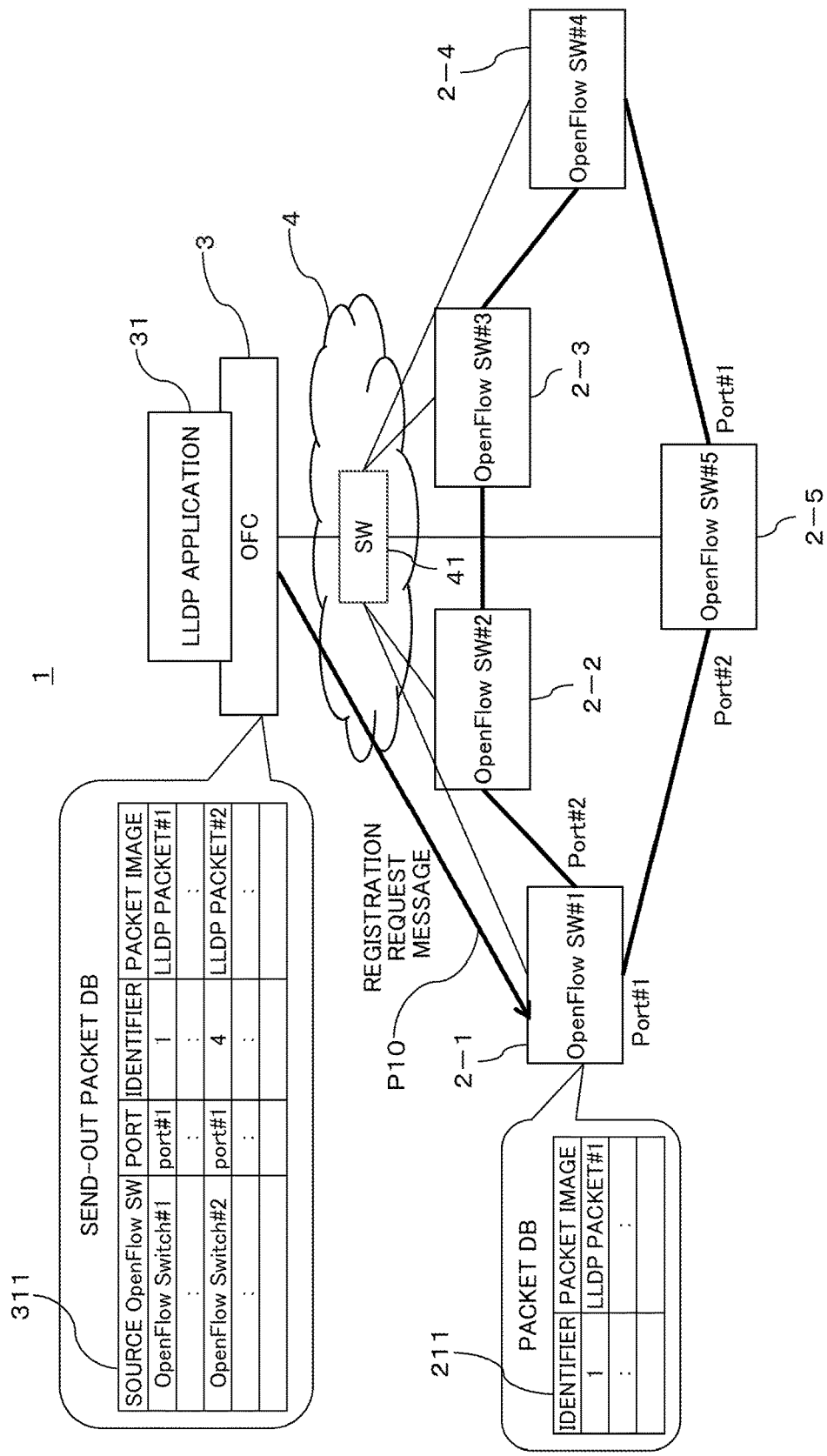

Next, as illustrated in FIG. 6, the LLDP application 31 may notify the source OpenFlow SW 2 (for example, the OpenFlow SW#1) of each LLDP packet via the OFC 3 of an image of the LLDP packet together with the corresponding identifier (Process P10).

A registration request message illustrated in FIG. 7 is applicable to the notification. The registration request message is an example of the extended message extended from a control message such as a packet-out and a packet-in in the OF protocol. An image of an LLDP packet and the corresponding identifier may be set to the message body. Further, the message type indicative of a "registration request" may be set to the OF header.

In response to the reception of the registration request message, the OpenFlow SW#1 may register the image and the identifier of the LLDP packet set in the message body in an internal DB 211, as illustrated in FIG. 6, for example. The DB 211 in the OpenFlow SW 2 may be referred to as a "packet DB 211" for the purpose of descriptions.

The packet DB 211 may store a plurality of pairs of a packet image to be sent out to the DP transmission path or a possible packet image received from the DP transmission path and the identifier corresponding to the packet image.

A registration request message may be transmitted to each of the OpenFlow SW 2 corresponding to a source of an LLDP packet. The packet DB 211 may be generated in each source OpenFlow SW 2 that has received a registration request message.

Further, an entry of the pair of a packet image and an identifier in the packet DB 211 can be added or deleted by a control message from the OFC 3. An example of the control message to add an entry may be the above registration request message.

Meanwhile, a control message to delete an entry (may be referred to as a "deletion request message") may be a message in which the message type in the OF header of the registration request message illustrated in FIG. 7 is changed to indicate a "Deletion request", for example.

An entry that is no longer needed in the packet DB 211 can be deleted by the deletion request message. Thus, it is possible to reduce or suppress the capacity prepared for the packet DB 211.

Figure 8:
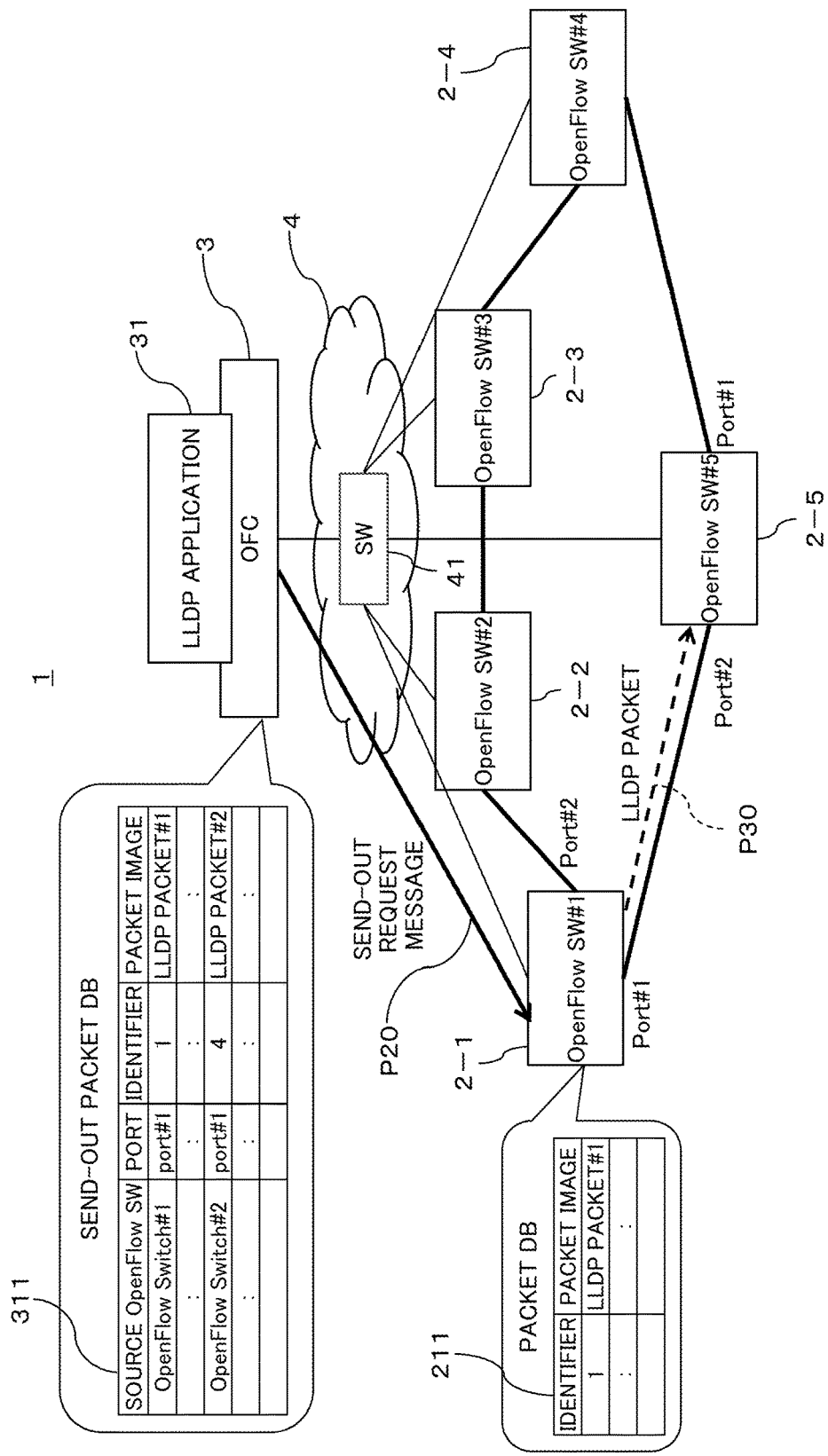
FIG. 8 is a diagram illustrating an operation example of the communication system according to the first embodiment.

After the registration in the packet DB 211 is completed, as illustrated in FIG. 8, the LLDP application 31 may request, based on the send-out packet DB 311, each source OpenFlow SW 2 to send out an LLDP packet from the designated port (Process P20).

A send-out request message (may also be referred to as a "send-out instruction") illustrated in FIG. 9 is applicable to the send-out request. The send-out request message is an example of the extended message extended from a control message (for example, a packet-out) addressed to the OpenFlow SW 2 in the OF protocol.

However, the message body of the send-out request message includes the identifier corresponding to an image of the LLDP packet to be sent out and source port information, and does not include the whole image of the LLDP packet. A message type indicative of a "send-out request" may be set to the OF header.

In the example of FIG. 8, the OFC 3 transmits, in response to a request from the LLDP application 31, to the OpenFlow SW#1 a send-out request message which requests the OpenFlow SW#1 to send out an LLDP packet of the identifier#1 from the port#1.

Upon receiving the send-out request message by the OpenFlow SW#1, the OpenFlow SW#1 refers to the packet DB 211 to read out an LLDP packet corresponding to the identifier#1 and sends out the LLDP packet from the port#1 (Process P30).

In the example of FIG. 8, the port#1 of the OpenFlow SW#1 is connected to the port#2 of the OpenFlow SW#5. Thus, the LLDP packet sent out from the port#1 of the OpenFlow SW#1 is received at the port#2 of the OpenFlow SW#5.

Figure 10:
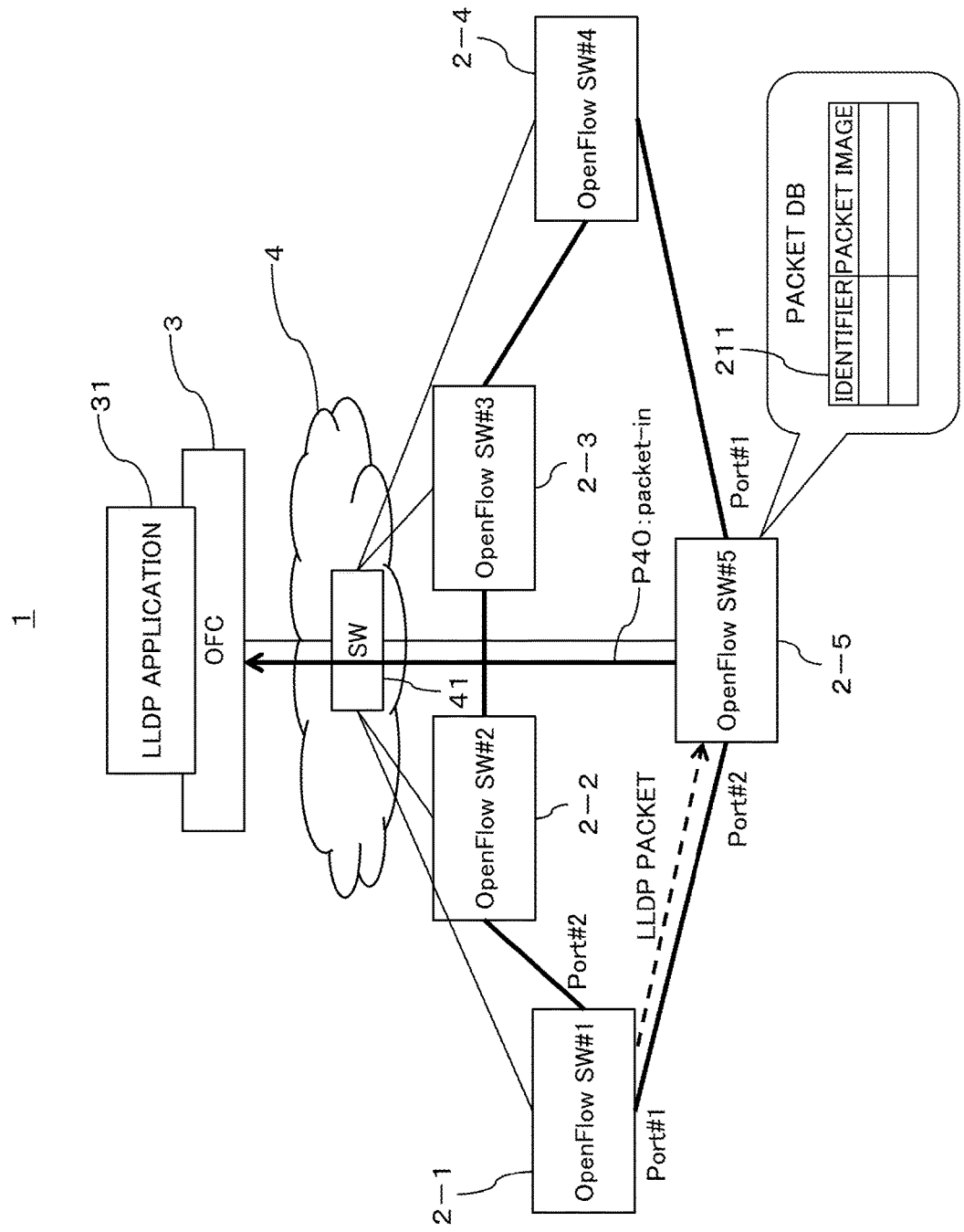
FIGS. 10 and 11 are diagrams illustrating an operation example of the communication system in the first embodiment.

The OpenFlow SW#5 registers therein a flow entry indicating that a packet in which "88-CC" indicative of the LLDP is set as the Ethernet type value is to be transmitted to the OFC 3. At this stage, however, as illustrated in FIG. 10, an entry of an LLDP packet having the same content as that of the received LLDP packet has not been registered in the packet DB 211 of the OpenFlow SW#5.

Thus, the OpenFlow SW#5 may transmit the received LLDP packet to the OFC 3 using the packet-in illustrated in FIG. 3B (Process P40). The packet-in may include an image of the LLDP packet, identification information of the OpenFlow SW#5 having received the LLDP packet, and reception port information.

Figure 11:
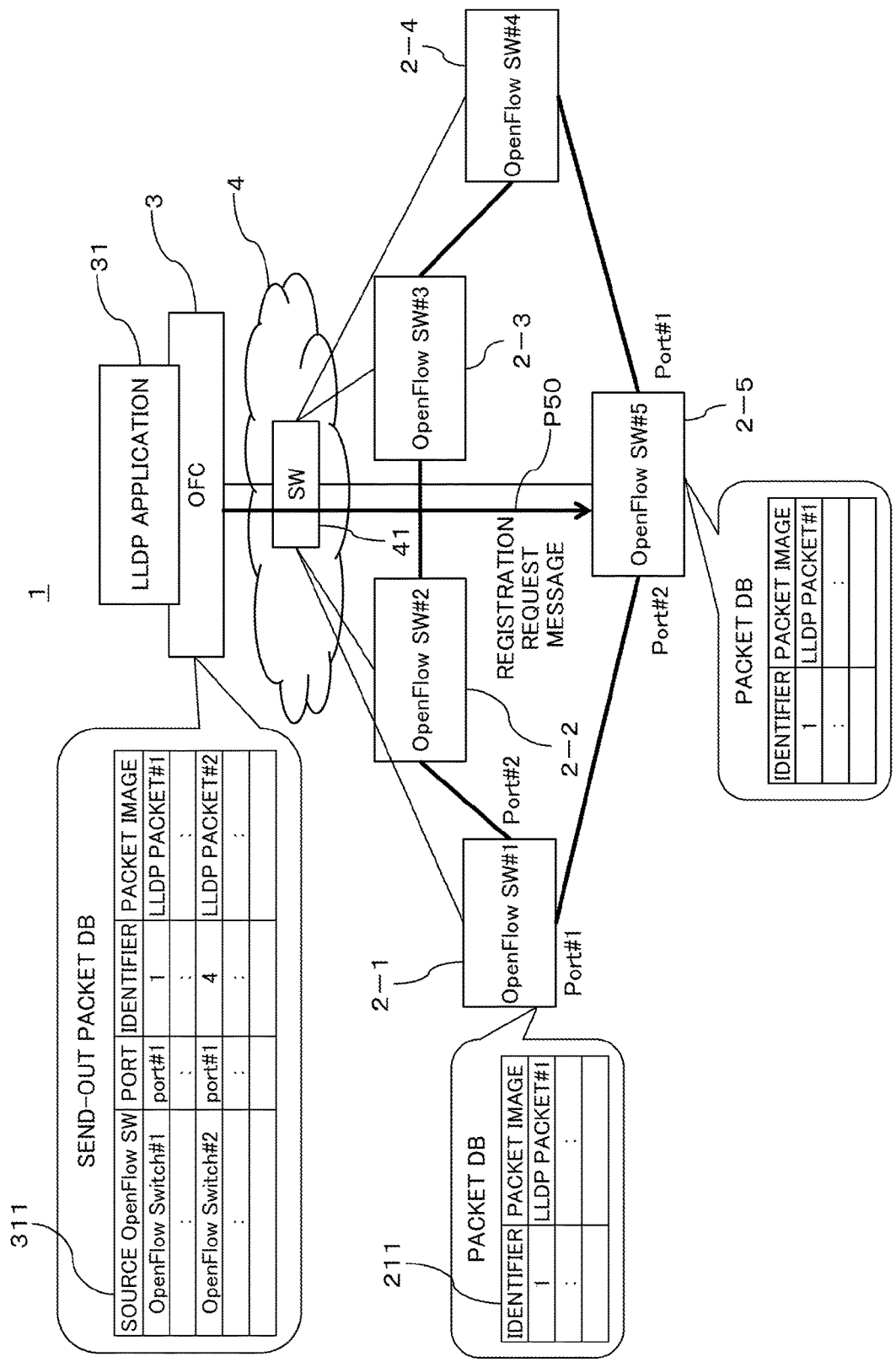

In response to a reception of the LLDP packet that is received by the OpenFlow SW#5, as illustrated in FIG. 11, the LLDP application 31 may notify the OpenFlow SW#5 of an image of the LLDP packet#1 and the corresponding identifier#1 (Process P50). Thereby, a pair of the image and the identifier#1 of the LLDP packet#1 is registered in the packet DB 211 of the OpenFlow SW#5.

Similar to FIG. 7, a registration request message illustrated in FIG. 12 is applicable to the above notification, for example. The registration request message is an example of the extended message extended from a control message addressed to the OpenFlow SW 2 in the OF protocol. An image of an LLDP message and the corresponding identifier may be set to the message body of the registration request message. Further, the message type indicative of a "registration request" may be set to the OF header.

In Process P50, the registration request message may be transmitted in response to a determination that some LLDP packets having the same content as that of the LLDP packet previously transmitted to the OFC 3 may be received repeatedly at the OpenFlow SW#5.

Then, as illustrated in FIG. 8, the LLDP application 31 may request the OpenFlow SW#1 to send out the LLDP packet corresponding to the identifier#1 again using a send-out request message. At this stage, the packet DB 211 of the OpenFlow SW#5 registers therein a packet of the same image as that of the LLDP packet received from the OpenFlow SW#1.

Figure 13:
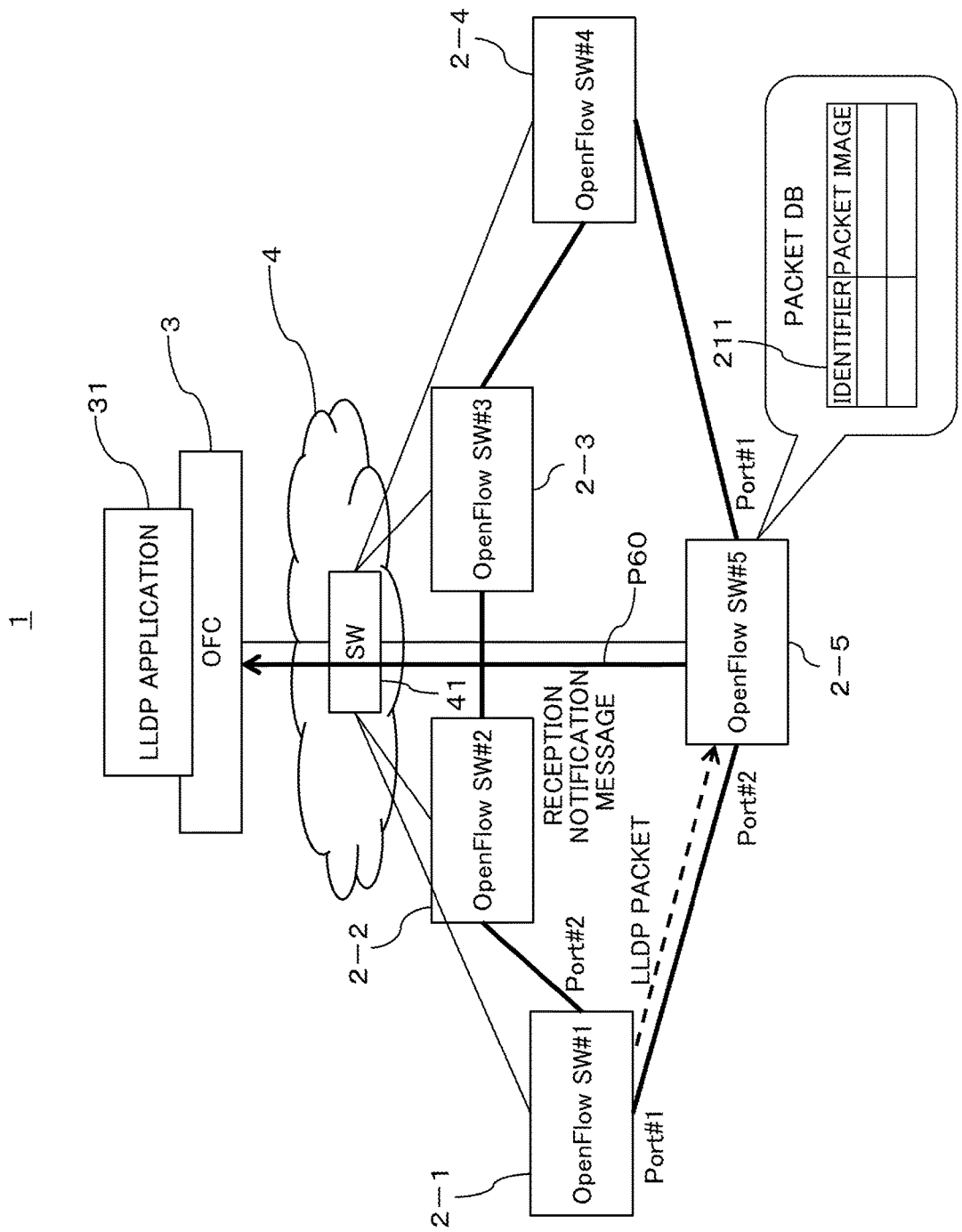
FIG. 13 is a diagram illustrating an operation example of the communication system in the first embodiment.

Therefore, as illustrated in FIG. 13, the OpenFlow SW#5 notifies the packet reception using the identifier#1 corresponding to the received LLDP packet#1 to the LLDP application 31 of the OFC 3 (Process P60).

A reception notification message illustrated in FIG. 14 is applicable to the notification of the packet reception. The reception notification message is an example of the extended message extended from a control message (for example, a packet-in) addressed to the OFC 3 in the OF protocol.

However, the message body of the reception notification message includes the identifier#1 corresponding to an image of the received LLDP packet#1 and reception port information and does not include the whole image of the received LLDP packet#1. The message type indicative of a "reception notification" may be set to the OF header.

As described above, the identifier corresponding to an image of an LLDP packet is used for a control message transmitted and received between the OFC 3 and each of the OpenFlow SW 2. Therefore, it is possible to reduce the traffic and the load of the control network 4.

Hence, it is possible to suppress a congestion in the control network 4, in other words, suppress a congestion in the CP communication between the OFC 3 and the OpenFlow SW 2.

Next, a configuration example of the OFC 3 and the OpenFlow SW 2 available to perform the above operation example and an operation example thereof will be described.

(Configuration Example of the OFC 3)

Figure 15:
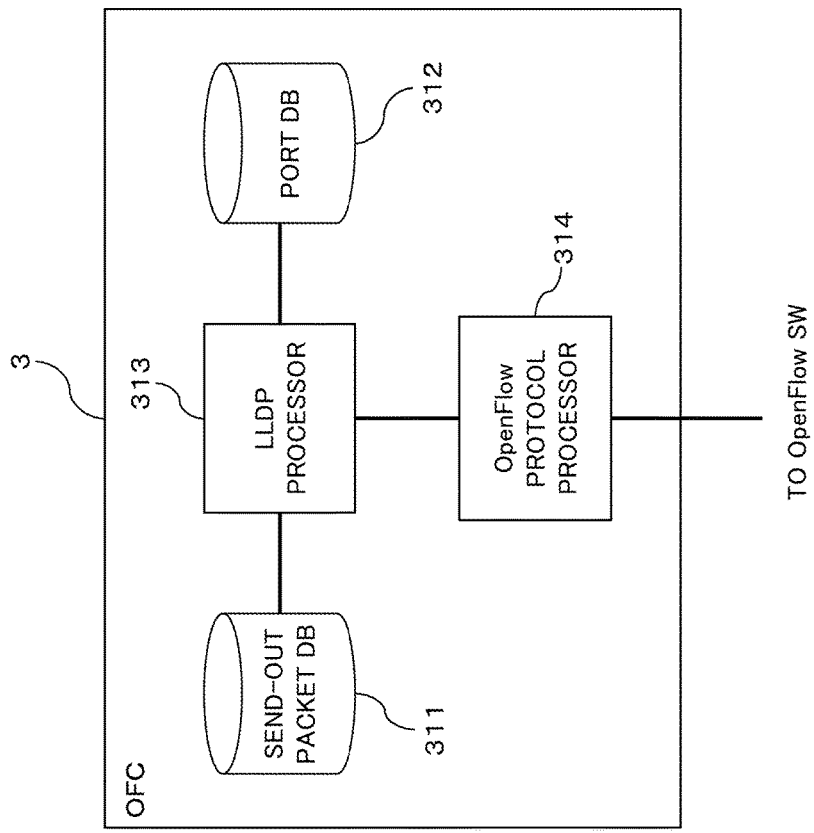
FIG. 15 is a block diagram illustrating a functional configuration example of an open flow controller (OFC) according to the first embodiment.

FIG. 15 is a block diagram illustrating a functional configuration example of the OFC 3.

As illustrated in FIG. 15, the OFC 3 may include, in addition to the send-out packet DB 311 described above, a port database (DB) 312, an LLDP processor 313, and an OF protocol processor 314.

The configuration example illustrated in FIG. 15 is a configuration example in case where the protocol application 31 which runs in the OFC 3 is an LLDP application. The protocol processor 314 may operate in accordance with a protocol implemented by the protocol application 31 that runs in the OFC 3.

The port DB 312 may store port information of all of the OpenFlow SWs 2 that are control targets of the OFC 3. Any one of pieces of port information stored in the port DB 312 may be set to the message body of a control message addressed to the OpenFlow SW 2, as described above.

The LLDP processor 313 may be realized by executing the LLDP application 31 to generate the send-out packet DB 311 and to process a message of the LLDP based on the information stored in the send-out packet DB 311 and the port DB 312.

For example, a message transmission process of the LLDP may include a process related to a generation and a transmission of an LLDP packet and/or a control message that may be the extended message. Further, the message transmission process may include a process related to a generation and an allocation of the identifier corresponding to an image of an LLDP packet. Meanwhile, a message reception process of the LLDP may include a process related to a reception of a control message. The control message may be the extended message, and is transmitted by the OpenFlow SW 2 and addressed to the OFC 3.

The OF protocol processor 314 may perform a process of transceiving a message for the OpenFlow SW 2 based on the OF protocol. For example, a transmission process of the OF protocol may include a process to encapsulate a message generated by the LLDP processor 313 in a message of the OF protocol and to transmit the encapsulated message to the OpenFlow SW 2.

Meanwhile, a reception process of the OF protocol may include a process to de-capsulate a message of the OF protocol received from the OpenFlow SW 2 to a message of the LLDP and to provide the de-capsulated message to the LLDP processor 313.

Each of the LLDP processor 313 and the OF protocol processor 314 is an example of a communication processor. The communication processor applies the identifier, which corresponds to an LLDP packet for a target of a flow control in the send-out packet DB 311, to the CP communication used to control the flow of the LLDP packet in the DP between the OpenFlow SW 2.

Figure 16:
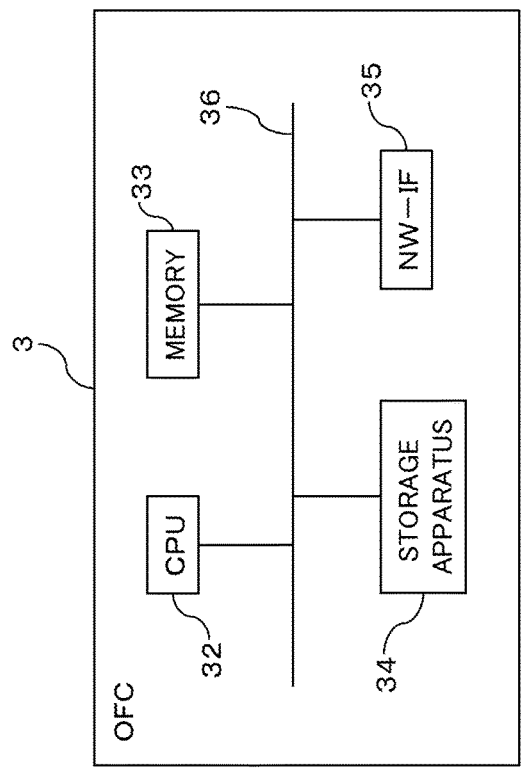
FIG. 16 is a block diagram illustrating a hardware configuration example of the OFC according to the first embodiment.

FIG. 16 is a block diagram illustrating a hardware configuration example of the OFC 3.

As illustrated in FIG. 16, the OFC 3 may include, for example, a CPU (Central Processing Unit) 32, a memory 33, a storage apparatus 34, and a network interface (NW-IF) 35. A plurality of NW-IFs 35 may be provided in the OFC 3. The CPU 32, the memory 33, the storage apparatus 34, and the NW-IF 35 may be communicably connected to each other by a communication bus 36.

The CPU 32 is an example of a processor with arithmetic capacities. A processor with arithmetic capacities may be referred to as a "computer". The "processor" may also be referred to as a hardware "processor circuit" or a hardware "processor device". The CPU 32 reads and executes a program and data stored in the memory 33 or the storage apparatus 34 to implement one or more of the functions and operations of the OFC 3.

A "program" may also be referred to as an "application" or a "software". The "data" may include data used to execute the "program" and data generated by the execution of the "program".

The program and the data may be provided in a form of recording in a computer readable storage medium such as a flexible disk, a CD-ROM, a CD-R, a CD-RW, an MO, a DVD, a Blu-ray disk, a USB memory.

A computer reads a control program or data from a storage medium and expands the control program and/or data into the memory 33 for execution, for example. The program and the data may be provided (in other words, downloaded) to the computer from a server or the like via a communication line.

The LLDP processor 313 and the OF protocol processor 314 illustrated in FIG. 15 may be realized by the CPU 32 that reads and executes a program (which may include the LLDP application 31) and/or data available for implementing the functions and operations of the OFC 3. The "program" may be a part of an operating system "OS" of a computer.

The memory 33 may be a work memory of the CPU 32 and used to temporarily store and expand a program and/or data stored in the storage apparatus 34 for operation of the CPU 32. The memory 33 may be a semiconductor memory such as a random access memory (RAM).

The storage apparatus 34 may store a program and data to implement the functions and operations of the OFC 3. A hard disk drive (HDD), a solid state drive (SSD) or the like is applicable to the storage apparatus 34, for example. The send-out packet DB 311 and the port DB 312 illustrated in FIG. 15 may be stored in the storage apparatus 34.

The memory 33 and the storage apparatus 34 may collectively be referred to as a "storage unit".

The NW-IF 35 may provide a connection interface to the control network 4. A control message such as the aforementioned extended message may be transceived through the NW-IF 35.

(Operation Example of the OFC 3)

Figure 17:
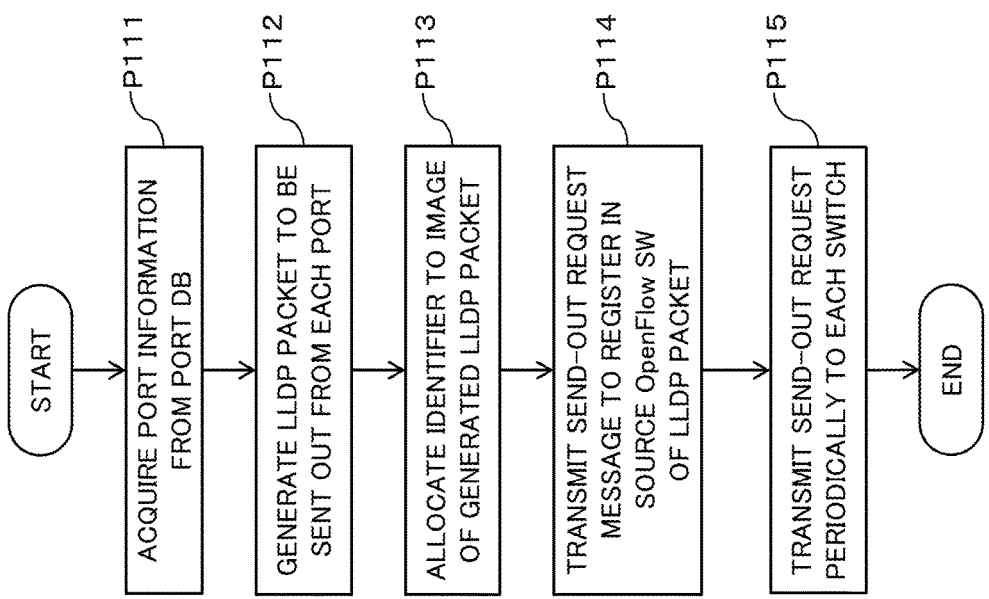
FIGS. 17 and 18 are flow charts illustrating an operation
Figure 18:
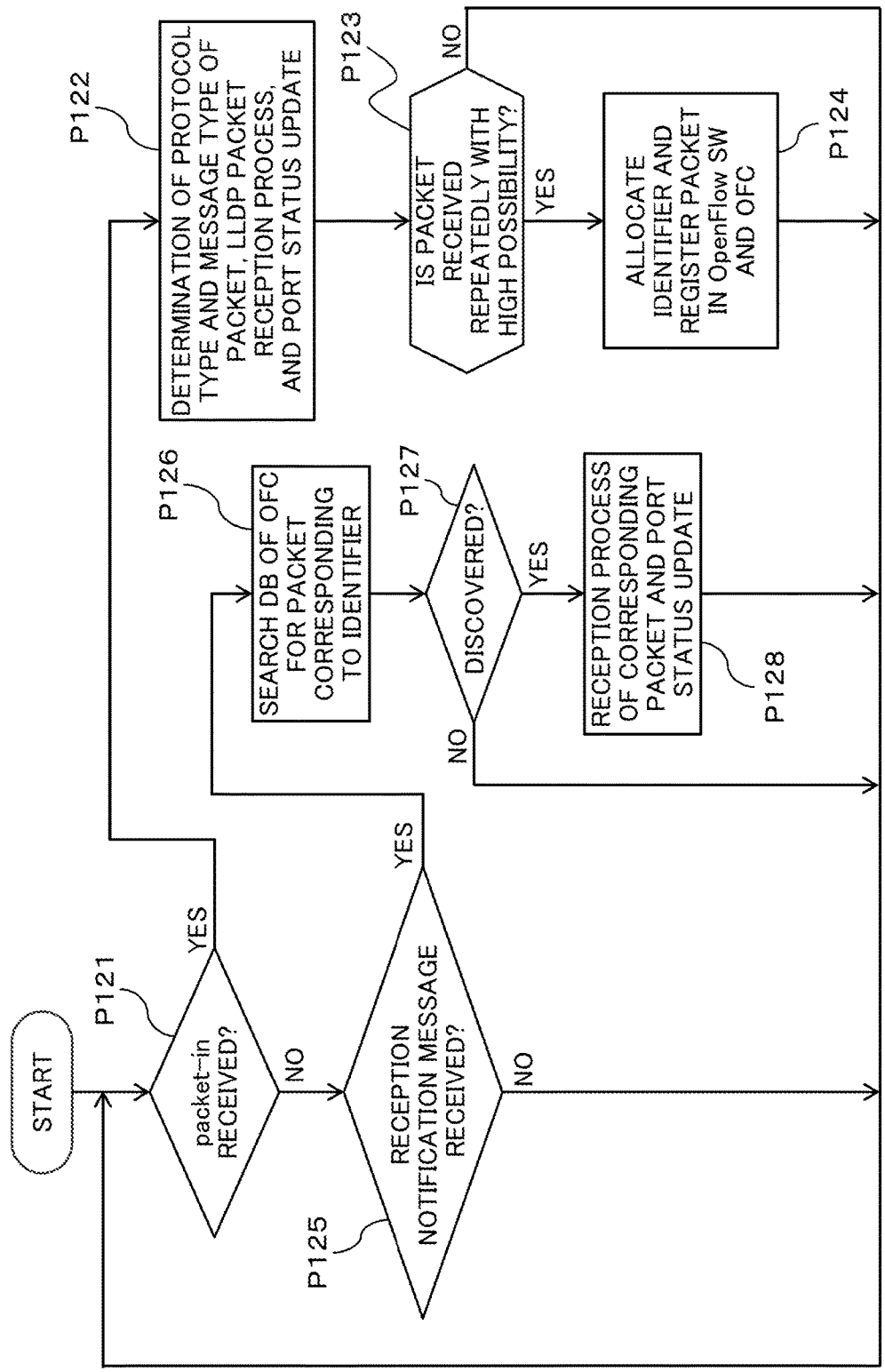

FIGS. 17 and 18 are flow charts illustrating operation examples of the OFC 3. As illustrated in FIG. 17, the OFC 3 refers to the port DB 312 through the LLDP processor 313 to acquire port information of the OpenFlow SW 2 that is to be a source of an LLDP packet (Process P111).

The LLDP processor 313 generates an LLDP packet to be sent out from the port identified by the acquired port information (Process P112). In response to a generation of an LLDP packet, the LLDP processor 313 generates and allocates an identifier to an image of the generated LLDP packet (Process P113).

Then, as illustrated on the upper left of FIG. 5, the LLDP processor 313 registers information about the source OpenFlow SW 2, information about the source port, and the allocated identifier in the send-out packet DB 311 for each image of the generated LLDP packet (Process P114).

In addition, the LLDP processor 313 generates a registration request message described with reference to FIGS. 6 and 7 to transmit the message to the source OpenFlow SW 2 of the LLDP packet. Accordingly, an image of the LLDP packet and the corresponding identifier are registered in the packet DB 211 of the source OpenFlow SW 2.

Hereinafter, as described with reference to FIGS. 8 and 9, the LLDP processor 313 may transmit a send-out request message including an identifier and source port information to each OpenFlow SW 2 (Process P115). The send-out request message may be transmitted periodically.

In response to the transmission of the send-out request message, the LLDP processor 313 may perform the flow chart illustrated in FIG. 18. For example, the LLDP processor 313 may check whether a packet-in transmitted by any one of the OpenFlow SW 2 is received (Process P121).

When a packet-in is received (YES in Process P121), the LLDP processor 313 may determine the protocol type or the message type by performing a reception process on the LLDP packet included in the received packet-in. Further, the LLDP processor 313 may update a port status of the source OpenFlow SW 2 of the received packet-in (Process P122).

For example, the LLDP application 31 is available to acquire an identifier of each OpenFlow SW 2 connected to any one of ports of the other OpenFlow SW 2 and port number information by performing the LLDP, for example. The LLDP application 31 can acquire such information by receiving an LLDP packet and so updates the "port status" by writing acquired information into the port DB 312.

Then, based on the determined protocol type or message type, the LLDP processor 313 may determine whether some LLDP packets having the same content may repeatedly be received by the source OpenFlow SW 2 of the packet-in (Process P123).

When "NO" is determined in Process P123, the LLDP processor 313 may bring the process to be performed back to Process P121. When "YES" is determined in Process P123, the LLDP processor 313 may allocate an identifier to the image of the received LLDP packet and register the packet in the send-out packet DB 311 (Process P124).

In addition, as described with reference to FIGS. 11 and 12, the LLDP processor 313 may transmit a registration request message to the source OpenFlow SW 2 of the packet-in. Accordingly, the image and identifier of the LLDP packet are registered in the packet DB 211 of the OpenFlow SW 2 (Process P124). After Process P124, the LLDP processor 313 may bring the process to be performed back to Process P121.

Meanwhile, when no packet-in is received (NO in Process P121), the LLDP processor 313 may check whether a reception notification message (see FIGS. 13 and 14) transmitted by any one of the OpenFlow SW 2 is received (Process P125).

When no reception notification message is received (NO in Process P125), the LLDP processor 313 may bring the process to be performed back to Process P121.

When a reception notification message is received (YES in Process P125), the LLDP processor 313 may search the send-out packet DB 311 for an image of the LLDP packet corresponding to the identifier included in the reception notification message (Process P126).

As a result of searching the send-out packet DB 311, when an image of the LLDP packet corresponding to the identifier included in the reception notification message exists (YES in Process P127), the LLDP processor 313 may perform a reception process by reading the image of the LLDP packet (Process P128). In addition, the LLDP processor 313 may update the port status of the source OpenFlow SW 2 of the reception notification message (Process P128).

When no image of the LLDP packet corresponding to the identifier included in the reception notification message is found in the send-out packet DB 311 (NO in Process P127), the LLDP processor 313 may bring the process to be performed back to Process P121.

As described above, the OFC 3 applies the identifier, which corresponds to an LLDP packet of a flow control target in the send-out packet DB 311, to CP communication used to control the flow of the LLDP packet in the DP between the OpenFlow SW 2.

Therefore, it is possible to reduce the traffic in the CP between the OFC 3 and the OpenFlow SW 2. Thus, it is possible to reduce the load of the control network 4 and to suppress a congestion in the control network 4.

(Configuration Example of the OpenFlow SW 2)

Figure 19:
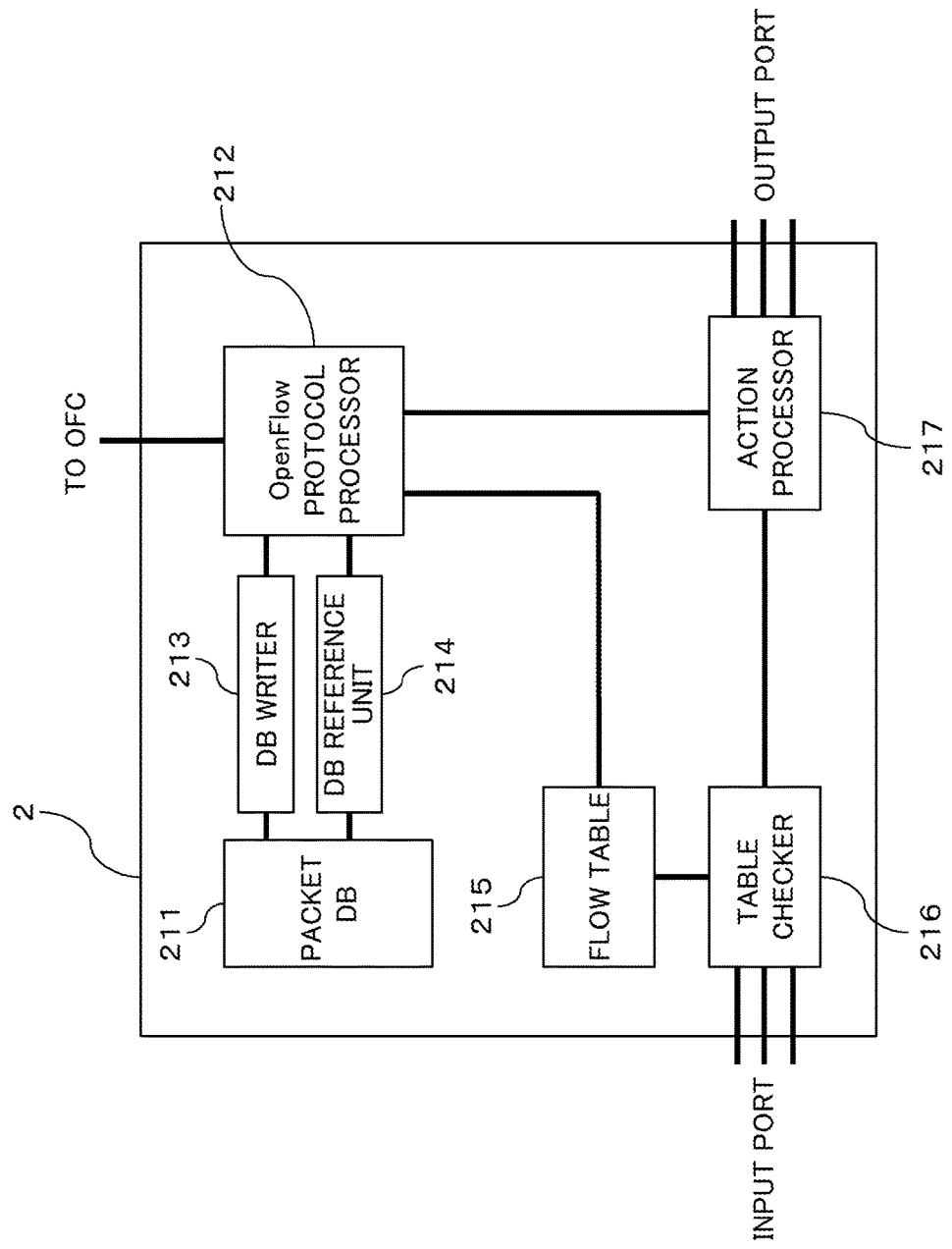
FIG. 19 is a block diagram illustrating a functional configuration example of an OpenFlow SW according to the first embodiment.

FIG. 19 is a block diagram illustrating a functional configuration example of the OpenFlow SW 2 described above. As illustrated in FIG. 19, the OpenFlow SW 2 may include, in addition to the packet DB 211 described above, an OF protocol processor 212, a DB writer 213, a DB reference unit 214, a flow table 215, a table checker 216, and an action processor 217, for example.

The OF protocol processor 212 may perform a transmission and reception process for the OFC 3 based on the OF protocol. For example, the transmission process in the OF protocol may include a process to transmit a control message such as the aforementioned extended message. Meanwhile, the reception process in the OF protocol may include a process to receive a control message such as the aforementioned extended message transmitted by the OFC 3.

The DB writer 213 may write and register into the packet DB 211 an image and an identifier of an LLDP packet included in a registration request message received from the OFC 3.

The DB reference unit 214 may refers to the packet DB 211 based on the identifier included in a send-out request message received from the OFC 3 to read an image of the LLDP packet corresponding to the identifier and to provide the read image to the OF protocol processor 212. The DB reference unit 214 may be referred to as a "DB search unit 214" that searches the packet DB 211 based on the identifier.

The OF protocol processor 212 transfers an image of an LLDP packet provided from the DB reference unit 214 to the action processor 217 to cause the action processor 217 to send out the LLDP packet to the DP transmission path.

The flow table 215 may store a flow entry including information indicative of a transfer destination (for example, an output port) that corresponds to a destination of a packet received from the DP transmission path. The flow entry may include a flow entry indicating that an LLDP packet received from a DP transmission path is to be transmitted to the OFC 3.

The table checker 216 transfers a packet received from a DP transmission path to an output port corresponding to the destination according to a flow entry in the flow table 215.

The action processor 217 performs a process corresponding to an "action" defined for a flow of a received packet (for example, a header field) that is transferred from the table checker 216. The "action" may be designated as a "transfer" (or "forwarding") or a "discard" (or "drop") of a packet, for example.

The OF protocol processor 212 may be an example of a first receiver that receives a control message including the identifier. The action processor 217 may be an example of a first transmitter that transmits to the DP a message in the packet DB 211, which corresponds to an identifier included in a control message received from the OFC 3.

Further, the table checker 216 may be an example of a second receiver that receives a message transmitted to the DP by the other OpenFlow SW 2. The OF protocol processor 212 may be an example of a second transmitter that transmits to the OFC 3 an identifier in the packet DB 211, which corresponds to a message received by the second receiver.

Figure 20:
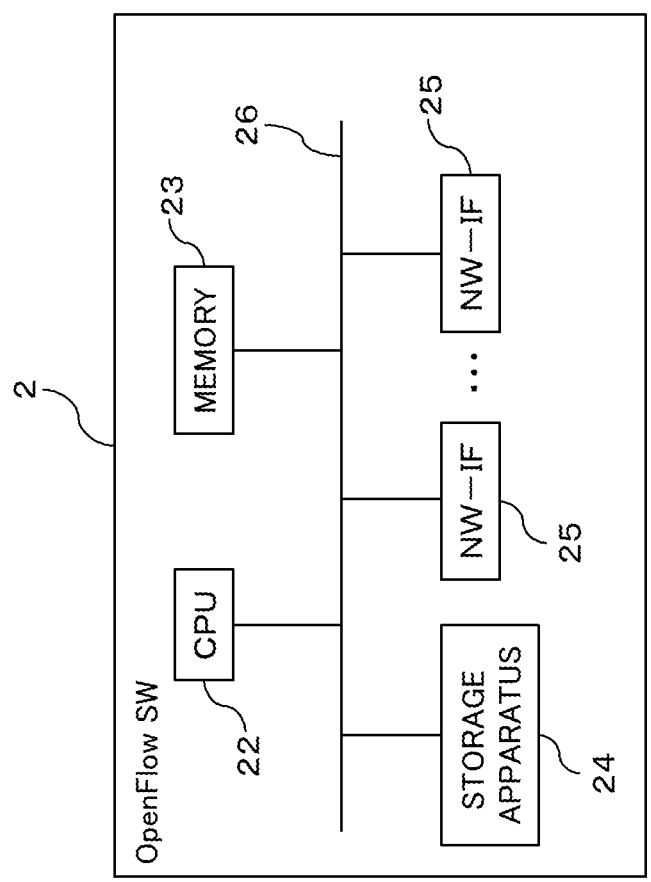
FIG. 20 is a block diagram illustrating a hardware configuration example of the OpenFlow SW according to the first embodiment.

FIG. 20 is a block diagram illustrating a hardware configuration example of the OpenFlow SW 2.

As illustrated in FIG. 20, the OpenFlow SW 2 may include, for example, a CPU (Central Processing Unit) 22, a memory 23, a storage apparatus 24, and an NW-IF 25. A plurality of NW-IFs 25 may be provided in the OpenFlow SW 2.

The CPU 22 is, similar to the CPU 32 of the OFC 3, an example of the processor with arithmetic capacities. The CPU 22 reads and executes a program and data stored in the memory 23 to implement functions and operations of the OpenFlow SW 2.

The "program" may also be referred to as an "application" or a "software". The "data" may include data used for execution of the "program" and data generated by execution of the "program".

The program and the data may be provided in a form of recording in a computer readable storage medium. A computer reads a program and/or data from a storage medium and expands the program and/or data into the memory 23 for execution. The program and/or the data may be provided (in other words, downloaded) to the computer from a server or the like via a communication line.

Each of the units 212 to 214, 216, and 217 illustrated in FIG. 19 may be realized by the CPU 22 that reads and executes a program and/or data available for implementing the functions and operations of the OpenFlow SW 2.

In other words, the CPU 22 of the OpenFlow SW 2 may be an example of a communication processor that processes the DP communication for the other OpenFlow SW 2 and the CP communication for the OFC 3. The OFC 3 is available to control a flow of the LLDP packets in the DP between the OpenFlow SWs 2 by using the CP communication.

The communication processor may include, for example, the OF protocol processor 212, the table checker 216, and the action processor 217 illustrated in FIG. 19. However, the communication processor may also include the DB writer 213, the DB reference unit 214, and the flow table 215 illustrated in FIG. 19.

The communication processor applies an LLDP packet registered in the packet DB 211 to the DP communication between the OpenFlow SWs 2, and applies an identifier corresponding to an LLDP packet of flow control target in the packet DB 211 to the CP communication for the OFC 3.

Accordingly, it is possible to reduce the traffic in the CP between the OpenFlow SW 2 and the OFC 3 while applying a standard LLDP packet to the DP communication between the OpenFlow SWs 2. In other words, it is possible to the traffic in the CP while surely supporting the LLDP function for the DP communication between the OpenFlow SWs 2.

The memory 23 may be a work memory of the CPU 22 and used to temporarily store and expand a program and/or data for operation of the CPU 22. The memory 23 may be a semiconductor memory such as RAM.

The storage apparatus 24 may store a program and/or data to implement functions and operations as the OpenFlow SW 2. an HDD, an SSD or the like is applicable to the storage apparatus 24, for example. The packet DB 211 and the flow table 215 illustrated in FIG. 19 may be stored in the storage apparatus 24.

The memory 23 and the storage apparatus 24 may collectively be referred to as a "storage unit".

The NW-IF 25 may provide a connection interface to the control network 4. A control message such as the aforementioned extended messages may be transceived through the NW-IF 25. Further, the NW-IF 25 may provide a connection interface for the other OpenFlow SW 2. The DP communication for the other OpenFlow SW 2 through the DP transmission path may be performed via the NW-IF 25.

(Operation Example of the OpenFlow SW 2)

Figure 21:
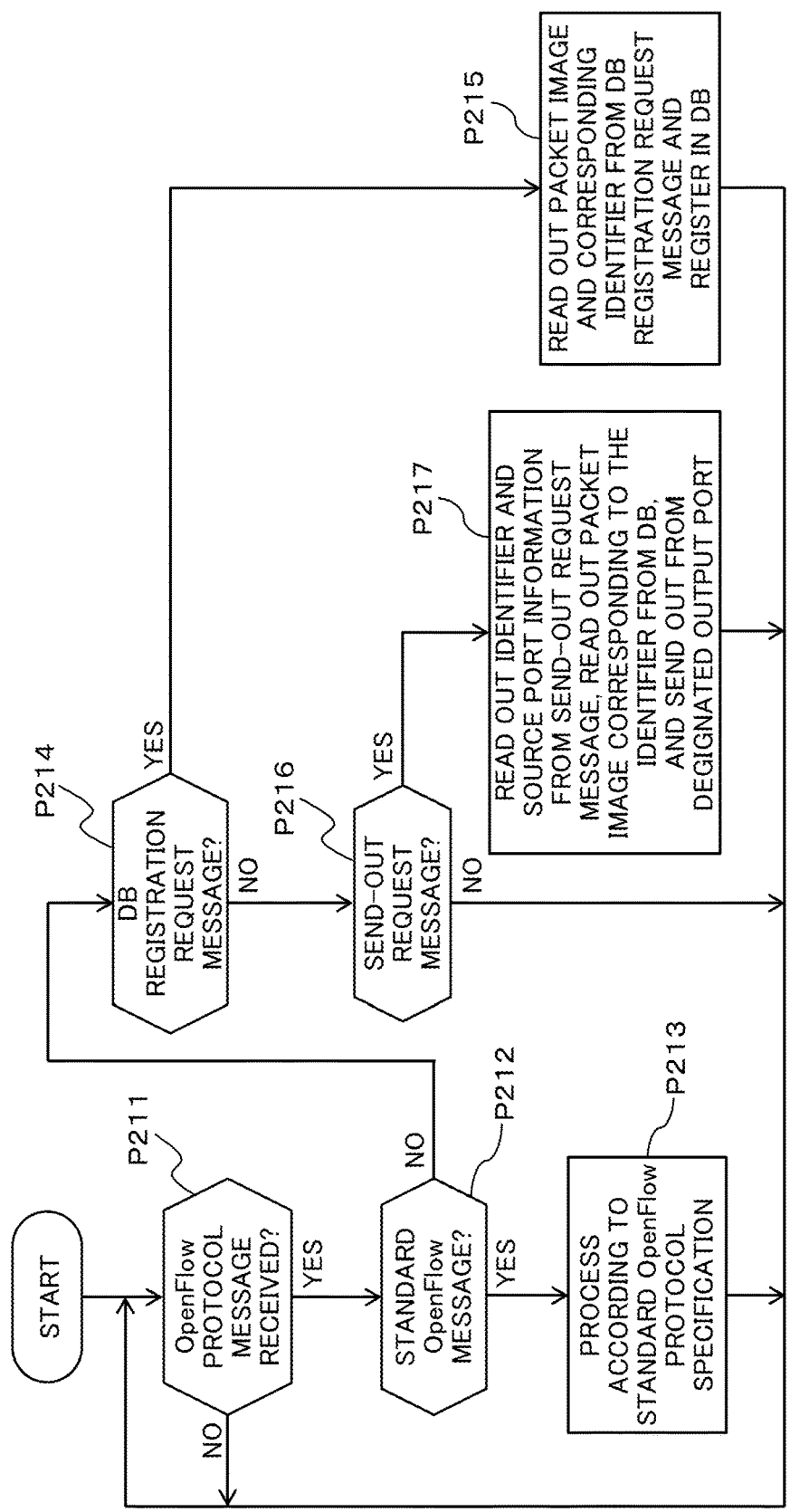
FIGS. 21 and 22 are flow charts illustrating an operation example of the OpenFlow SW according to the first embodiment.
Figure 22:
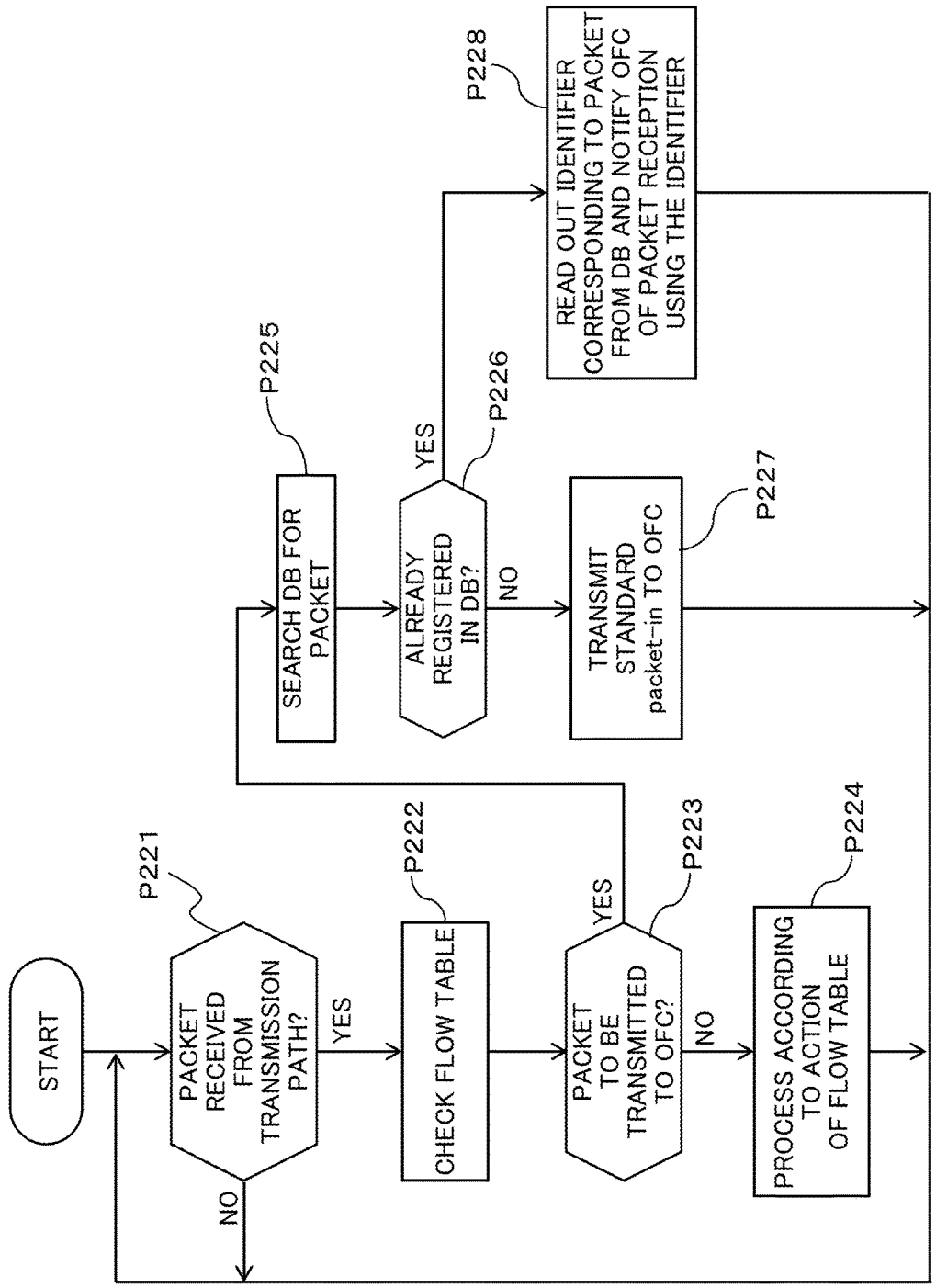

FIGS. 21 and 22 are flow charts illustrating operation examples of the OpenFlow SW 2. As illustrated in FIG. 21, the OpenFlow SW 2 checks whether a message of the OF protocol is received by the OF protocol processor 212, for example (Process P211).

When no message of the OF protocol is received (NO in Process P211), the OF protocol processor 212 may continue to check whether a message of the OF protocol is received.

When a message of the OF protocol is received (YES in Process P211), the OF protocol processor 212 checks whether the received message is a standard control message of the OF protocol with reference to the message type of the received message (Process P212).

When the received message is a standard control message of the OF protocol (YES in Process P212), the OF protocol processor 212 may process the received message according to a specification of the standard OF protocol (Process P213).

When the received message is a packet-out, the OF protocol processor 212 may perform a process of sending out an LLDP packet from the port designated by the packet-out.

Meanwhile, When the received message is not a standard control message of the OF protocol (NO in Process P212), the OF protocol processor 212 may check whether the received message is a registration request message based on the message type of the received message (Process P214).

When the received message is a registration request message (YES in Process P214), the OF protocol processor 212 may register in the packet DB 211 an image of the LLDP packet included in the registration request message and the corresponding identifier (Process P215). The registration may be performed by the DB writer 213.

Meanwhile, when the received message is not a registration request message (NO in Process P214), the OF protocol processor 212 may further check whether the received message is a send-out request message (Process P216).

When the received message is a send-out request message (YES in Process P216), the OF protocol processor 212 may reads, via the DB reference unit 214, an image of an LLDP packet corresponding to an identifier included in the send-out request message from the packet DB 211. Then, the OF protocol processor 212 sends out the read image of the LLDP packet from the output port corresponding to source port information included in the send-out request message (Process P217).

As described above, when the OpenFlow SW 2 receives from the OFC 3 an instruction designated an identifier to send out an LLDP packet to the DP transmission path, the OpenFlow SW 2 sends out the LLDP packet corresponding to the identifier registered in the packet DB 211 to the DP transmission path.

When the received message is neither registration request message nor send-out request message (NO in both Process P214 and Process P216), the OF protocol processor 212 may bring the process to be performed back to Process P211.

Separate from the above processes, as illustrated in FIG. 22, the OpenFlow SW 2 may check whether a packet is received from the DP transmission path by the table checker 216, for example (Process P221).

When no packet is received from the transmission path (NO in Process P221), the table checker 216 may continue to monitor whether any packet is received. When a packet is received from the transmission path (YES in Process P221), the table checker 216 may check the flow table 215 (Process P222) to identify whether the received packet is a packet to be transmitted to the OFC 3 (Process P223).

When the received packet is not to be transmitted to the OFC 3 (NO in Process P223), the table checker 216 may cooperate with the action processor 217 to perform a process according to an "action" that matches conditions in the flow table 215 (Process P224).

Meanwhile, When the received packet is to be transmitted to the OFC 3 (YES in Process P223), the table checker 216 may transfer the received packet to the OF protocol processor 212 via the action processor 217.

When the OF protocol processor 212 receives the packet transferred by the table checker 216, the OF protocol processor 212 may search the packet DB 211 by the DB reference unit 214 to check whether content of the received packet is already registered in the packet DB 211 (Process P225 and Process P226).

When the content is already registered (YES in Process P226), the OF protocol processor 212 may read from the packet DB 211 the identifier corresponding to the content of the received packet and notify the OFC 3 of a packet reception by using the identifier (Process P228). The notification may be performed by using a reception notification message (see FIG. 14) that includes the identifier and reception port information.

As described above, the OpenFlow SW 2 determines whether the received packet is to be transmitted to the OFC 3 based on the flow entries registered in the flow table 215. When a positive determination is made, the OpenFlow SW 2 compares the received packet with the entries in the packet DB 211 to transmit to the OFC 3 an identifier registered in a matched entry.

Meanwhile, when the content of the received packet is not registered in the packet DB 211 (NO in Process P226), the OF protocol processor 212 may transmit the received packet to the OFC 3 by using the packet-in of the standard OF protocol (Process P227).

As described above, the OpenFlow SW 2 applies an LLDP packet in the packet DB 211 to the DP communication for the other OpenFlow SW 2, and applies an identifier corresponding to an LLDP packet of a flow control target in the packet DB 211 to the CP communication for the OFC 3.

Therefore, it is possible to reduce the traffic in the CP between the OpenFlow SW 2 and the OFC 3 while using the standard LLDP packet for the DP communication between the OpenFlow SWs 2. Hence, it is possible to reduce the load of the control network 4 and to suppress the congestion in the control network 4 while surely supporting the LLDP function in the DP communication between the OpenFlow SW 2.

(Second Embodiment)

Figure 23:
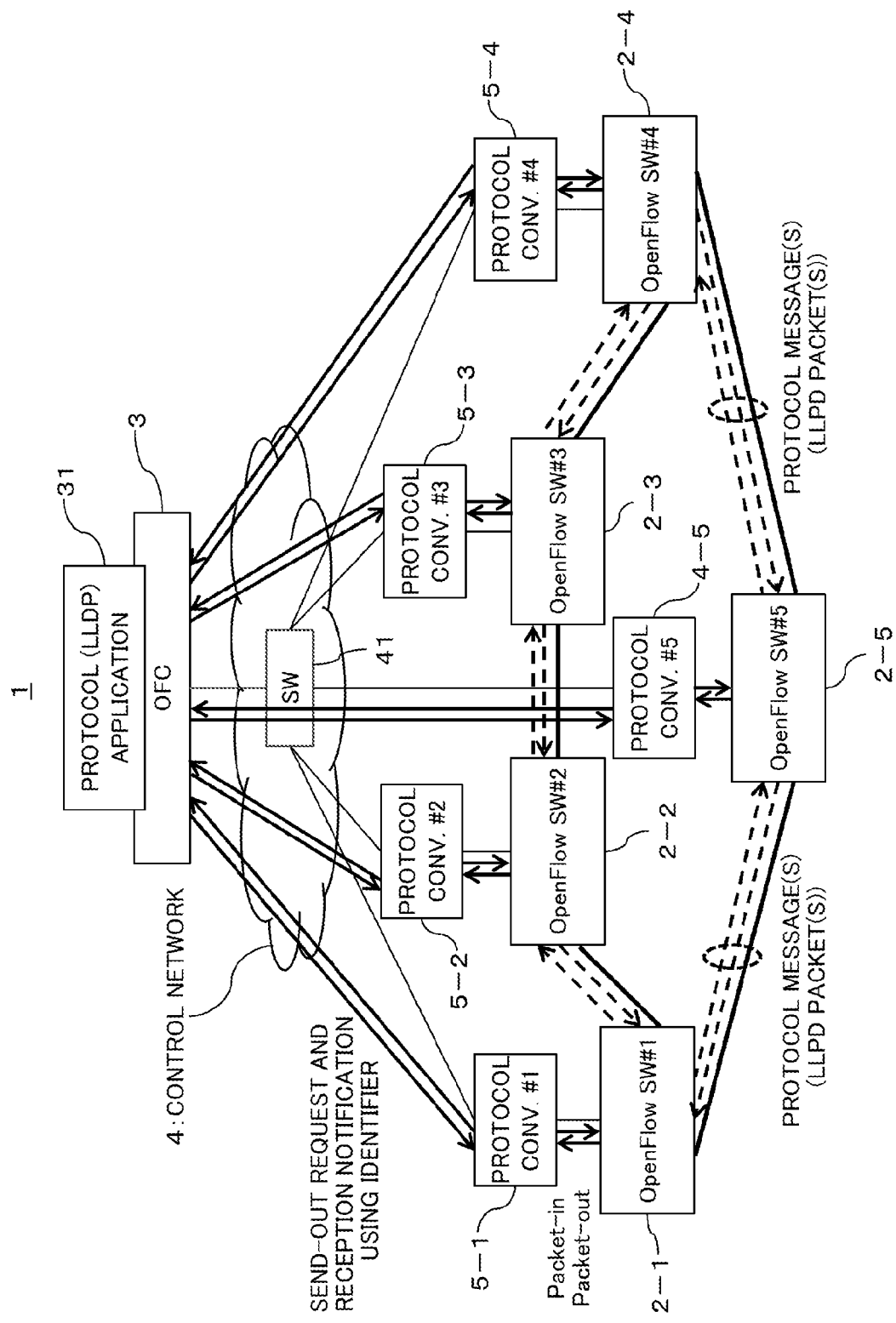
FIG. 23 is a block diagram illustrating a configuration example and an operation example of a communication system according to a second embodiment.

FIG. 23 is a block diagram illustrating a configuration example of the communication system according to a second embodiment. The communication system 1 illustrated in FIG. 23 is different from that of the first embodiment illustrated in FIG. 1 in that a protocol converter 5-*i* is provided for each path between the OFC 3 and the OpenFlow SWs 2-*i*. When there is no need to distinguish the protocol converters 5-*i* each other, they may be abbreviated as the "protocol converter(s) 5".

Each of the protocol converters 5-*i* is communicably connected to the corresponding OpenFlow SW 2-*i* and also communicably connected to the OFC 3 via the control network 4.

The protocol converter 5 may perform a protocol conversion between the extended message (such as the registration request, the send-out request, and the reception notification) using the identifier described in the first embodiment and a standard control message of the OF protocol (such as the packet-out and the packet-in). The protocol converter 5 may be considered as an example of a relay apparatus that relays CP communication between the OFC 3 and the OpenFlow SWs 2.

For example, each of the protocol converters 5 transmits to and receives from the OFC 3 the extended message (such as the registration request, the send-out request, and the reception notification) using an identifier described in the first embodiment. In other words, the protocol converter 5 performs a transmission and/or a reception of the extended message performed by the OpenFlow SW 2 in the first embodiment in place of the OpenFlow SW 2.

Figure 24:
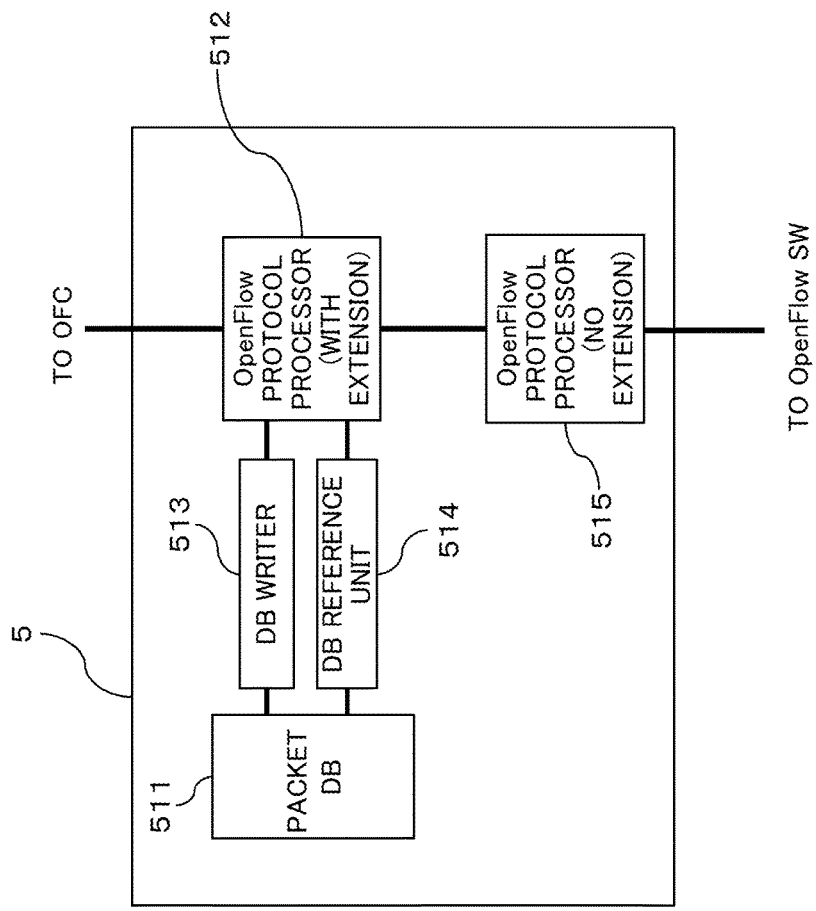
FIG. 24 is a block diagram illustrating a functional configuration example of a protocol converter according to the second embodiment.

Thus, the protocol converter 5 may include, as illustrated in FIG. 24, units 511 to 514 respectively corresponding to the units 211 to 214 (see FIG. 19) provided in the OpenFlow SW 2 in the first embodiment.

An OF protocol processor 515 illustrated in FIG. 24 processes the standard control messages of the OF protocol while the OF protocol processor 512 processes the extended messages.

Therefore, the OF protocol processor 512 may also be referred to as an extended OF protocol processor 512 and the OF protocol processor 515 may also be referred to as a standard OF protocol processor 515.

In FIG. 24, each of the OF protocol processors 512 and 515 is an example of a communication processor. The communication processor may also include the DB writer 513 and the DB reference unit 514.

The communication processor applies the identifier in the packet DB 511, which corresponds to an LLDP packet of a flow control target, to the CP communication for the OFC 3. Meanwhile, the communication processor applies an LLDP packet corresponding to any one of identifiers in the packet DB 511 to the CP communication for any one of the OpenFlow SWs 2.

Figure 25:
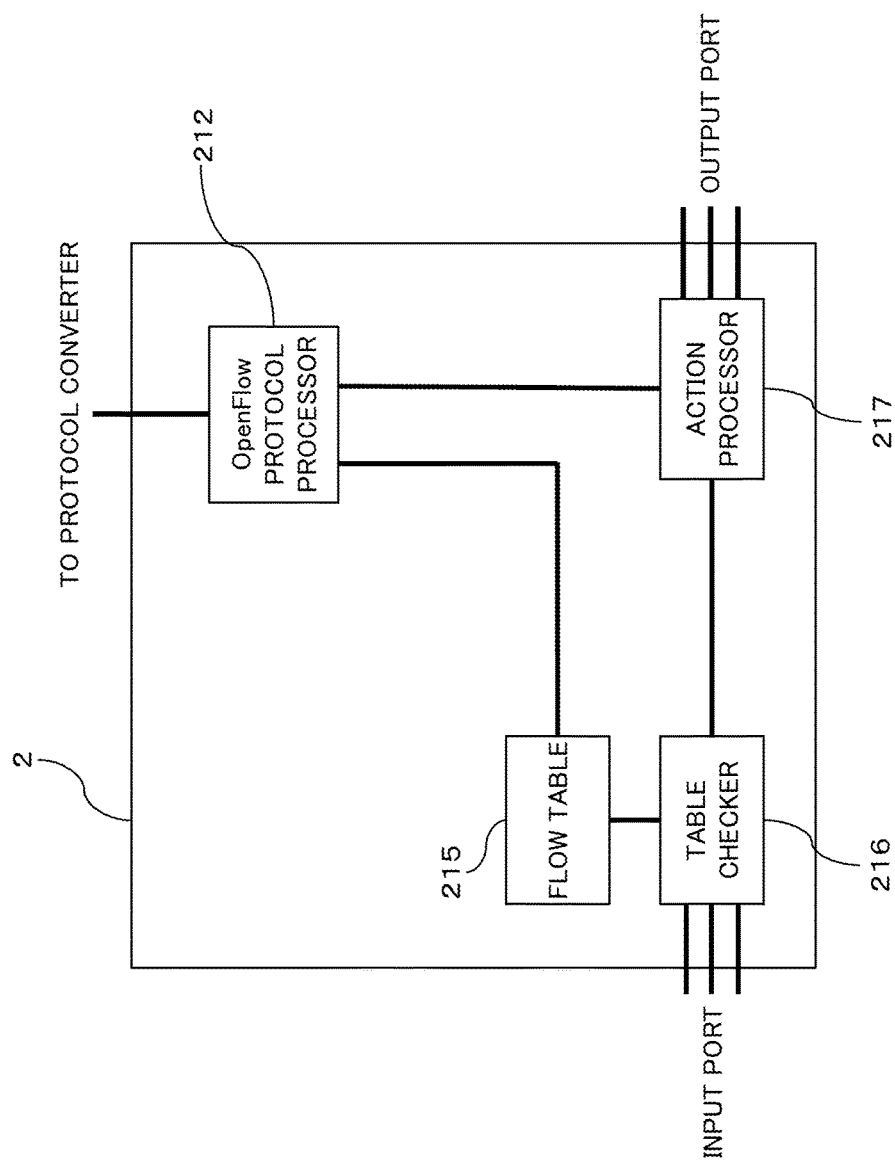
FIG. 25 is a block diagram illustrating a functional configuration example of the OpenFlow SW according to the second embodiment.

Since the protocol converters 5-*i* are provided, there is no need for the OpenFlow SW 2 in the second embodiment to support processing of the extended message. Thus, as illustrated in FIG. 25, the units 211 to 214 illustrated in FIG. 19 may be unnecessary in the OpenFlow SW 2 of the second embodiment.

In other words, the OpenFlow SW 2 of the second embodiment does not need a functional extension to support the extended message described in the first embodiment, in addition to the standard control message of the OF protocol.

A hardware configuration example of the OpenFlow SW 2 according to the second embodiment may be the same as the configuration example illustrated in FIG. 20 in the first embodiment. Further, a hardware configuration example of the protocol converter 5-*i* may be the same as the configuration example of the OFC 3 illustrated in FIG. 16. For example, the packet DB 511 may be stored in a memory or a storage apparatus provided in the protocol converter 5-*i*. Further, the above communication processor may be realized by a CPU provided in the protocol converter 5-*i*.

(Operation Example)

Hereinafter, an operation example of the second embodiment will be described. It is assumed that the LLDP application 31 as an example of the protocol application is run in the OFC 3 as in the first embodiment.

As in the first embodiment, the LLDP application 31 may set a flow entry indicating that a packet in which "88-CC" indicative of an LLDP is set to the Ethernet type value is to be transmitted to the OFC 3, for all of the OpenFlow SWs 2 to be controlled by the OFC 3.

Next, the LLDP application 31 generates an LLDP packet as an example of the protocol message to be sent out from each port of the OpenFlow SWs 2. The LLDP application 31 may generate, similar to the first embodiment (for example, FIG. 5), the send-out packet DB 311 in which information of the source OpenFlow SW 2, information of the source port, and the identifier are registered for each image of the generated LLDP packet.

Next, the LLDP application 31 may notify the protocol converter 5-*i* corresponding to the source OpenFlow SW 2-*i* of each LLDP packet of an image of the LLDP packet together with the corresponding identifier via the OFC 3. The registration request message that is an example of the extended message illustrated in FIG. 7 is also applicable to the notification.

In response to a reception of the registration request message, the protocol converter 5-*i* may register in the internal packet DB 511 the image and identifier of an LLDP packet set to the message body.

The registration request message may be transmitted to each of the protocol converters 5-*i* corresponding to the source OpenFlow SW 2-*i* of an LLDP packet. The packet DB 511 may be generated in each of the protocol converters 5-*i* that received the registration request message.

After the registration with the packet DB 511 of the protocol converter 5-*i* is completed, the LLDP application 31 may transmit a send-out request message (see FIG. 9) to the protocol converter 5-*i* corresponding to the source OpenFlow SW 2-*i* based on the send-out packet DB 311.

As in the first embodiment, the identifier corresponding to an image of the LLDP packet to be sent out and source port information are included in the message body of the send-out request message and the whole image of the LLDP packet is not included.

In response to a reception of the send-out request message, the protocol converter 5-*i* searches the packet DB 511 based on the identifier to read the corresponding image of the LLDP packet. Then, the protocol converter 5-*i* sets the read image in a packet-out and transmits the packet-out to the corresponding OpenFlow SW 2-*i*.

In other words, the protocol converter 5-*i* converts the send-out request message received from the OFC 3 into, for example, the standard packet-out illustrated in FIG. 3A and transmits the standard packet-out to the OpenFlow SW 2-*i*.

In response to a reception of the packet-out, the OpenFlow SW 2-*i* (for example, the OpenFlow SW#1) sends out the image of an LLDP packet included in the packet-out from the designated port (for example, the port#1).

In the example of FIG. 23, the port#1 of the OpenFlow SW#1 is connected to the port#2 of the OpenFlow SW#5. Thus, the LLDP packet sent out from the port#1 of the OpenFlow SW#1 is received at the port#2 of the OpenFlow SW#5.

The OpenFlow SW#5 registers therein a flow entry indicating that a packet in which "88-CC" indicative of the LLDP is set as the Ethernet type value is to be transmitted to the OFC 3. Thus, the OpenFlow SW#5 notifies the protocol converter#5 of a packet reception using a standard packet-in of the OF protocol.

For example, the packet-in may include the image of an LLDP packet, identification information of the OpenFlow SW#5 that received the LLDP packet, and reception port information.

In the protocol converter#5, the image of the LLDP packet received in the packet-in from the OpenFlow SW#5 has not been registered in the packet DB 511 at this stage. Thus, the protocol converter#5 may transmit the image of the received LLDP packet to the OFC 3 using the standard packet-in of the OF protocol illustrated in FIG. 3B, for example.

The OFC 3 transmits the image of the LLDP packet received from the protocol converter#5 using the packet-in to the LLDP application 31 together with identification information of the OpenFlow SW#5 that received the LLDP packet and reception port information.

When the LLDP application 31 receives the image of the LLDP packet received by the OpenFlow SW#5, the LLDP application 31 may notify the image of the LLDP packet and the corresponding identifier to the packet DB 511 of the protocol converter#5. The registration request message illustrated in FIG. 12 is applicable to the notification. The image of the LLDP packet and the corresponding identifier may be set to the message body of the registration request message.

The registration request message may be transmitted to the protocol converter#5 in response to a determination that some LLDP packets having the same content may be received repeatedly at the OpenFlow SW#5.

Then, the LLDP application 31 may transmit a send-out request message to the protocol converter#1 to request the OpenFlow SW#1 to send out the LLDP packet corresponding to the identifier#1 again. At this stage, a packet of the same image as that of the LLDP packet received from the OpenFlow SW#1 is already registered in the packet DB 511 of the protocol converter#5.

Therefore, the protocol converter#5 notifies to the LLDP application 31 in the OFC 3 a packet reception using the identifier corresponding to the received LLDP packet transmitted to the protocol converter#5 by the OpenFlow SW#5 using the packet-in.

The reception notification message illustrated in FIG. 14 is applicable to the notification of the packet reception. The message body of the reception notification message includes the identifier corresponding to an image of the received LLDP packet and reception port information and does not include the whole image of the received LLDP packet.

As described above, by additionally providing the protocol converter 5-*i* in the communication system 1, it is possible to reduce the load in the control network 4 even when the OpenFlow SW 2 that does not support processing of the extended message exists in the communication system 1.

In other words, by merely adding the protocol converter 5-*i* to the communication system 1, it is possible to achieve operations and effects similar to those in the first embodiment with no need to make a functional extension or modification to the OpenFlow SWs 2 that would exist in a large number in the communication system 1. Therefore, it is possible to facilitate in introducing the process of the control message using the identifier described in the first embodiment into the existing (or legacy) communication system 1.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, alterations could be made hereto without departing from the spirit and scope of the invention.

What is claimed is:

1. A flow switch comprising:
a storage unit configured to store a plurality of protocol messages for a communication protocol used in a data plane communication and a plurality of identifiers associated one with each of the plurality of protocol messages; and
a processor coupled to the storage unit and the processor configured to:
apply a protocol message one selected from the plurality of protocol messages stored in the storage unit to the data plane communication;
apply an identifier associated with a protocol message of a control target of a flow and one selected from the plurality of identifiers stored in the storage unit to a control plane communication for a controller, the controller being configured to control any one of flows of the protocol messages in the data plane communication;
receive a control message for the control plane from the controller, the control plane message including one of the plurality of identifiers; and
select a protocol message from the storage unit to transmit the selected protocol message in the data plane communication, the selected protocol message corresponding to the identifier included in the control message.

2. The flow switch according to claim 1, wherein the processor further configured to:
receive a message transmitted in the data plane communication by another flow switch; and
select an identifier from the storage unit to transmit the selected identifier to the controller with the control plane communication, the selected identifier corresponding to the message received by the second reception unit.

3. The flow switch according to claim 1, wherein the communication protocol is a link layer discovery protocol and the control plane communication is a communication based on an open flow protocol.

4. A controller comprising:
a storage unit configured to store a plurality of protocol messages for a communication protocol used in a data plane communication between a plurality of flow switches and a plurality of identifiers associated one with each of the plurality of protocol messages; and
a processor coupled to the storage unit and the processor configured to:
apply an identifier associated with a protocol message of a control target of a flow and one selected from the plurality of identifiers stored in the storage unit to a control plane communication for controlling any one of flows of the protocol messages in the data plane communication;
receive a control message for the control plane, the control plane message including one of the plurality of identifiers; and
select a protocol message from the storage unit to transmit the selected protocol message in the data plane communication, the selected protocol message corresponding to the identifier included in the control message.

5. A relay apparatus configured to relay a control plane communication between a controller and a plurality of flow switches, the relay apparatus comprising:
a storage unit configured to store a plurality of protocol messages for a communication protocol used in a data plane communication between the flow switches and a plurality of identifiers associated one with each of the plurality of the protocol messages; and
a processor coupled to the storage unit and the processor configured to:
apply an identifier associated with a protocol message of a control target of a flow and one selected from the plurality of identifiers stored in the storage unit to a control plane communication for the controller, the controller being configured to control any one of flows of the protocol messages in the data plane communication;
apply a protocol message to the control plane communication for any one of the flow switches, the protocol message applied to the control plane communication corresponding to the identifier selected from the storage unit;
receive a control message for the control plane from the controller, the control plane message including one of the plurality of identifiers; and
select a protocol message from the storage unit to transmit the selected protocol message in the data plane communication, the selected protocol message corresponding to the identifier included in the control message.

* * * * *